United States Patent [19]
Duvvoori et al.

[11] Patent Number: 6,021,438
[45] Date of Patent: Feb. 1, 2000

[54] LICENSE MANAGEMENT SYSTEM USING DAEMONS AND ALIASING

[75] Inventors: Vikram Duvvoori, Salinas; Vikram Sahai, Santa Cruz; Balaji Parthasarathy, Santa Cruz; Neil Waldhauer, Santa Cruz, all of Calif.

[73] Assignee: Wyatt River Software, Inc., Santa Clara, Calif.

[21] Appl. No.: 08/897,213

[22] Filed: Jun. 18, 1997

[51] Int. Cl.[7] .............................. G06F 9/30; G06F 12/00
[52] U.S. Cl. ..................... 709/224; 709/305; 712/210
[58] Field of Search ....................... 395/200.3, 200.31, 395/200.32, 200.33, 200.47, 200.49, 200.56, 200.59, 200.6, 200.43, 200.54, 200.55, 200.8, 680, 682, 685, 385, 386; 709/200, 201, 202, 203, 217, 213, 219, 226, 229, 230, 224, 225, 250, 300, 302, 305; 712/209, 210; 713/200, 201

[56] References Cited

U.S. PATENT DOCUMENTS

| | | | |
|---|---|---|---|
| 4,937,863 | 6/1990 | Robert et al. | 380/4 |
| 5,023,907 | 6/1991 | Johnson et al. | 380/4 |
| 5,138,712 | 8/1992 | Corbin | 395/200.59 |
| 5,386,369 | 1/1995 | Christiano | 364/464.01 |
| 5,390,297 | 2/1995 | Barber et al. | 395/200 |
| 5,487,158 | 1/1996 | Amelina et al. | 395/705 |
| 5,490,256 | 2/1996 | Mooney et al. | 395/568 |
| 5,671,412 | 9/1997 | Christiano | 395/615 |
| 5,673,315 | 9/1997 | Wolf | 395/685 |
| 5,689,708 | 11/1997 | Regnier et al. | 395/200.59 |
| 5,692,129 | 11/1997 | Sonderegger et al. | 395/200.33 |
| 5,835,749 | 11/1998 | Cobb | 395/500 |
| 5,859,978 | 1/1999 | Sonderegger et al. | 395/200.56 |

OTHER PUBLICATIONS

Davis, Beth; CommunicationsWeek, CMP Publications, Mar. 18, 1996, n601, p. 35(1).

Blumenthal, Holly; InforWorld, InfoWorld Publishing, Nov. 18, 1996, v18, n47, p. 102(11).

*Primary Examiner*—Frank J. Asta
*Assistant Examiner*—Marc D. Thompson
*Attorney, Agent, or Firm*—Ronald C. Fish; Falk & Fish

[57] ABSTRACT

A license restriction management system having wrapper programs and agents as appropriate to manage launches of application programs in distributed systems of computers having a multiplicity of different operating systems. The system includes passive monitoring where only data regarding launches is collected or active monitoring where the number of copies of licensed programs in execution at any particular time is actively controlled by the agents and wrappers in cooperation with a license restriction management process. Configuration of the agents to use TCP or UDP communication protocols and to do automatic denial of unauthorized applications based upon either locally kept or centrally kept lists of authorized applications.

24 Claims, 6 Drawing Sheets

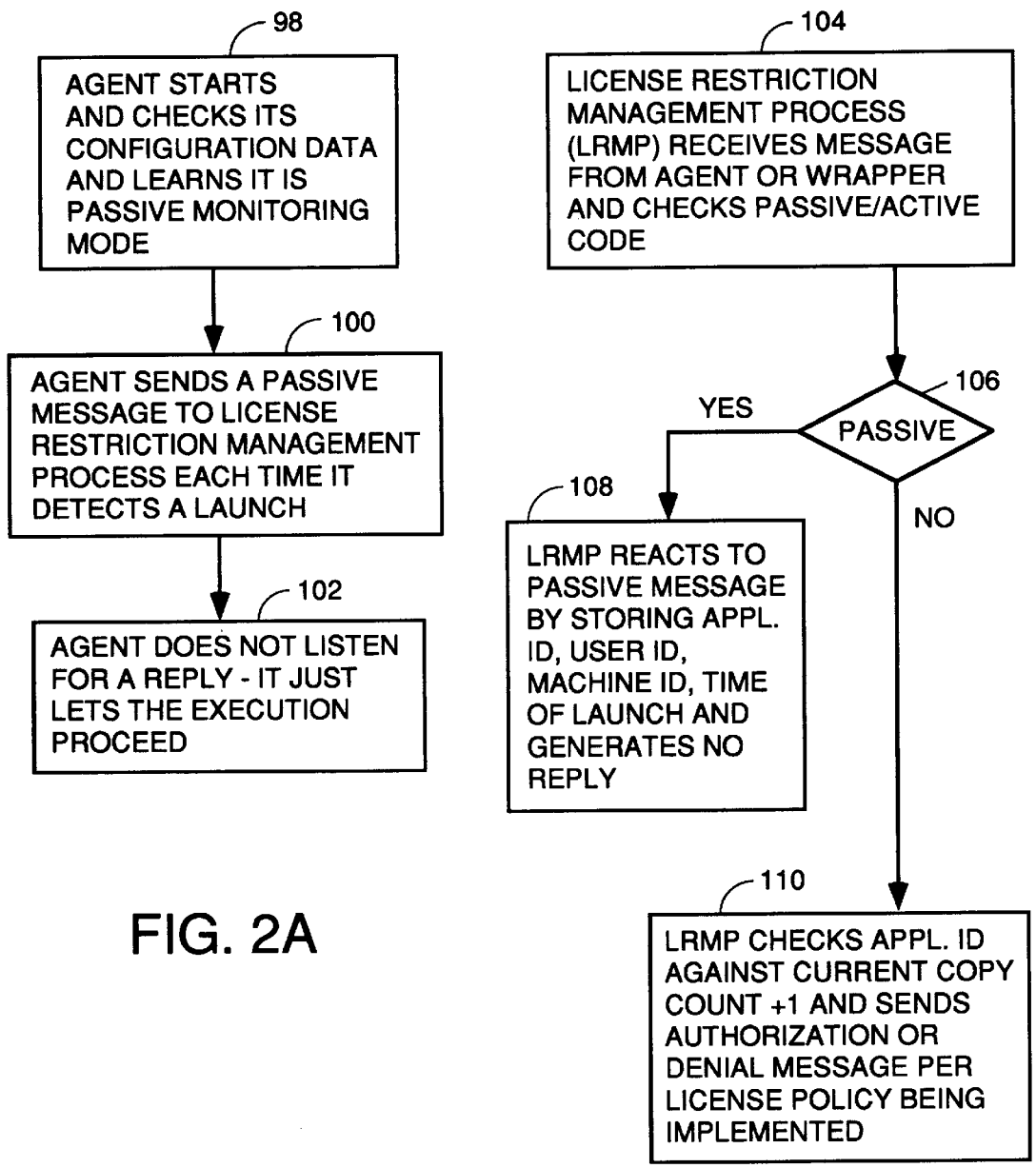

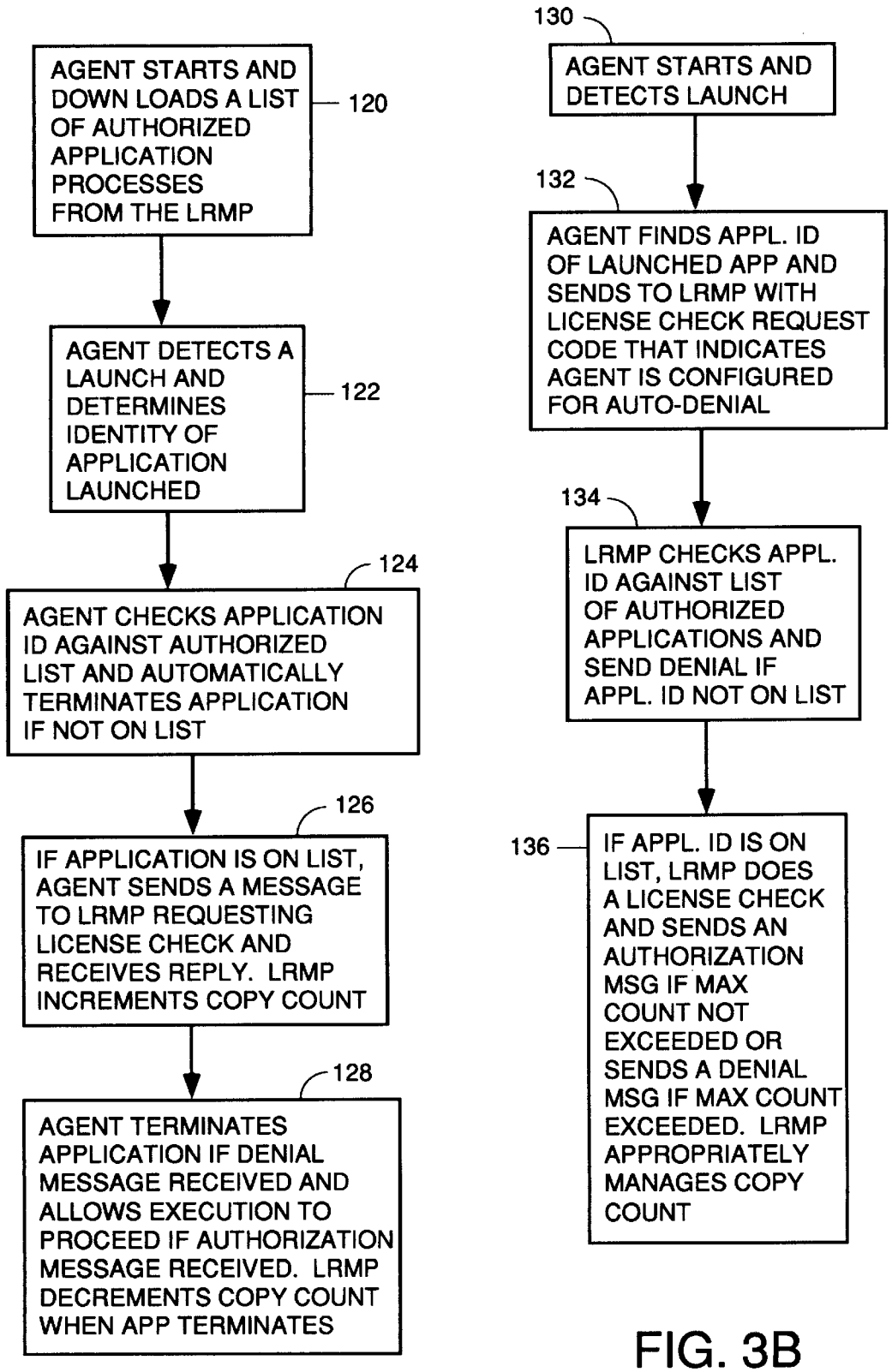

LICENSE MANAGEMENT SYSTEM USING DAEMONS AND ALIASING

BACKGROUND OF THE INVENTION

The invention pertains to the field of system administration in distributed systems of computers in an enterprise, and, more particularly to the field of software for assisting network managers to administer the system to insure that the number of copies of any particular licensed software application does not exceed the number of licenses for that application the enterprise currently holds.

Enterprise liability for copyright violations is a serious concern in enterprises with multiple computers. Typically, software applications are sold with licenses that grant permission for a predetermined number of copies of the software to be executed at any particular time. System administrators of networks in enterprises with multiple computers like to know that no more than a programmable number of copies of an application program are running at any particular time so that they can be sure that the number of copies of a licensed application program does not exceed the number of licensed copies. Administrators also like to know what applications are being run and how often they are being run for purposes of evaluating how many upgrades to buy, whether to buy upgrades etc.

When Novell NetWare was a dominant network transport layer protocol or network operating system and application programs were being launched off central file servers, the above stated problem was solved by workers in the art having the NetWare operating system report the launch of any application to a licensing process running on the central file server or elsewhere to get permission or denial for the launch. This approach had the problem that it was based on "hooks" in the NetWare operating system, i.e., there were built-in dependencies on the NetWare operating system software. Thus, the system did not work where the network was not a Novell NetWare system.

As people migrated to different network operating systems, a new approach was developed which was operating-system independent. In this system, the applications to be launched were cloaked in "wrappers". A wrapper is a software layer which intercepts a launch request, reports the launch request to the licensing management process in an active monitoring message, and then, if permission is granted for the launch, launches the requested application out of a hidden directory. The wrapper inserts itself into the directory where the application it wraps originally resided and moves the application to a hidden directory so that launch messages directed to the application are intercepted by the wrapper program. Wrappers are part of the prior art, but wrapper programs that generate messages that are coded as either active monitoring or passive monitoring messages are not part of the prior art as to the assignee of the present invention having been commercially released by the assignee as of the Jun. 21, 1996 software release.

Wrappers worked fine for awhile, but with the evolution of operating systems, new ways of launching applications continued to spring up. Each time a new way to launch an application appeared, the wrapper mechanism had to be redesigned usually to account for the new launch mechanism.

This became burdensome, so "agents" were developed. Agents are background daemons which monitor all activities on a desktop and report launches of all applications and other tasks to a licensing process running locally or remotely on another computer. The agent then receives authorization messages or denials from the licensing management process and kills the application if the launch is not within the terms of the license management policies encoded in the license management process.

As operating systems continued to develop and mixed platform networks with mixed operating systems started to appear (with some computers in the environment having operating systems for which wrapper programs did not exist), license management software products were developed which used a combination of wrappers and agents to monitor launches from either local hard drives or file servers elsewhere on the network. The assignee of the present invention has several predecessor products released prior to the release of the present version which implemented wrappers alone, agents alone, and combinations of wrappers and agents.

However, the emergence of the Windows NT® operating system caused the most recent predecessor product to fail since Windows NT works in such a way that prior agent designs did not work reliably when users logged on and logged off the shared machine running NT and, in addition, were impractical in that they consumed approximately 90% of the available computing resources just to run the agent process.

Further, Windows NT runs 16-bit programs by creating VDMs called virtual machines to fool 16-bit programs into thinking they are running alone on a Windows 3.1 machine. The VDMs were themselves 32-bit processes running under NT, but the agents available before the invention described herein, even if they somehow worked, could not tell the user ID and path of the 16-bit application running inside the VDM since the 32-bit agent could only detect the launch of the 32-bit VDM emulator process itself and could not determine which 16-bit applications were launched inside the VDM. This situation was unacceptable for a license management process which needed to have the user ID and path or identity of the application being executed for purposes of managing whether the process is licensed etc.

Thus, a need arose for a license management software product which could use a combination of wrappers and agents where the agents would work properly with the Windows NT operating system and could track the launching of either 32-bit applications or 16-bit applications launched within VDMs or shared VDMs.

SUMMARY OF THE INVENTION

The teachings of the invention contemplate a distributed computing system with one or more file servers coupled by a network to a plurality of workstations or desktop computers, with a license restriction management process running one or more places in the system and with wrappers and agents capable of dealing with the peculiarities of Windows NT operating systems in execution on the file servers and desktop computers and actively cooperating with the license restriction management process to enforce license restriction on the number of copies of licensed programs that are executing at any one time or to otherwise assist in carrying out licensing/management policy and to obtain information to assist in management of software license/upgrade decisions. Typically, the license restriction management process executes on the one or more file servers, but in some species within the genus of the invention, the license restriction management process can be a collection of replicated databases on each desktop computer which are accessed by local copies of the license management process. The replicated databases (which may also just be text files) store data regarding how many copies of each licensed program are authorized and how many are currently running, and may include other data such as collections of data about launches and terminations of all processes regardless of whether or not they fall within the licensing policy being enforced. The replicated databases are kept up to date by a central communication daemon which receives launch and restore messages from the wrappers and agents spread throughout the system and sends update messages to the replicated databases.

Computers within the distributed systems that are running operating systems which only support methods of launching application programs which wrapper programs can always detect can have wrapper programs installed thereon to detect launches and terminations and communicate with the license restriction management process. Such computers could also have agents installed thereon instead of wrappers if the operating system and the methodology by which the agent detects launches and terminations are compatible. Wrappers are programs which intercept launch requests for licensed applications and communicate information regarding the launch to the license restriction management process and get an authorization or a denial reply therefrom. The wrapper finishes carrying out the launch when the launch is authorized and prevents the launch when it is not authorized. There is one wrapper per licensed application to be managed. Wrappers, when installed, insert themselves into the directory where the licensed application is, move the licensed application to a hidden directory, and then function as described above to manage launches. If a launch is authorized, the wrapper invokes the application program into execution out of the hidden directory. For applications that request information from the operating system regarding where they were launched from for purposes of finding, for example, help files, dictionaries etc., the wrapper tells the application program it was launched from the directory where it used to be. Versions of wrapper programs were known in prior art and in the predecessor products of the assignee of the present invention. However, wrappers for the SGI IRIX, IBM AIX, and Santa Cruz Operations (SCO) operating systems were not commercially available or in public use by the assignee of the present invention before Jun. 21, 1996.

Wrappers do not work reliably enough for some computers in the distributed system with newer operating systems that allow methods of invocation of application programs such as OLE or other newer methods. This is because wrappers do not detect OLE launches and some other types of launches which can occur in computers running the Windows 3.1 or Windows 95 or Windows NT operating systems. Launches in Macintosh operating systems are detected using agents, and these agents were not in public use or commercially available from the assignee of the present invention before January 1997. Prior versions of agents that could detect launches in Windows 3.1 or Windows 95 systems were known in the prior art products of the assignee of the invention. However, these prior art agents were redesigned for the Jun. 21, 1996 release of the software product described herein to have several new configuration options described more fully below in the discussion of a 32-bit agent 96. As of the Jun. 21, 1996 release, the 32-bit NT agents were application processes and did not run as services. Later in the August/September 1996 release, the 32-bit agent process 96 was rewritten to run as an NT service in the background. These new configuration options were: the ability to select between TCP and UDP communication protocols for communication with the license restriction management process 34 sometimes referred to hereafter and in the claims as the "license policy enforcement process", passive monitoring mode, and automatic denial of unregistered application launches.

The new and old 16-bit agents detected launches by any of three different ways of monitoring all activities on the desktop. One of these ways was by periodically polling the list of tasks running which the operating system kept and comparing a later list to the next previous list to determine which tasks are newly launched and which have been terminated. A second way was by requesting notification from the operating system each time a new window is created. A third way is by requesting notification from the operating system whenever a new task was created.

However, none of these three ways was stable enough or sufficiently reliable for use in Windows NT systems, so a new method of detecting launches in Windows NT systems for agent processes was developed for distributed system license management systems and processes according to the teachings of the invention. The Windows NT agent process is a novel subsystem of the overall system of the invention. The Windows NT agent process detects launches of all applications including licensed applications by monitoring the loading of a particular Dynamic Linked Library which Windows NT loads whenever it launches a new task such as a licensed application. This Dynamic Linked Library or DLL is loaded when virtually any task is initiated so it is a reliable enough indicator of new task activity for purposes of agent launch detection in NT systems. Further, this method of launch detection in Windows NT systems is much more stable in that it does not cause the system to crash or freeze when users log on and off like the other methodologies used in the prior art 16-bit agents had a tendency to do.

Windows NT systems are designed for 32-bit application programs which are coded assuming that they will be run on an NT system which provides protected memory space for each application. That is, the legal addresses in the address space for each process running on an NT system are different from the legal addresses in the address space of other applications which are simultaneously running. This is an improvement over Windows 3.1 and Windows 95 systems which used shared address spaces and suffered from the infirmity that when one application crashed, it caused all the other applications which were running at the same time to also crash. Application programs coded to run on Windows 3.1 and Windows 95 systems assumed they were in a shared memory environment and were called 16-bit application programs. Because Windows NT is backwards compatible, such systems frequently have both 32-bit and 16-bit applications running on them. The DLL is loaded only when 32-bit applications are launched, so detection of launches of 16-bit applications required redesign of prior art 16-bit agents for this invention so as to be able to detect launches of either 32 or 16-bit applications in NT systems. This is done as follows.

Windows NT systems run 16-bit applications by creating a VDM or "virtual computer" which looks to the 16-bit application like a separate, standalone Windows 3.1 or Windows 95 computer. VDMs come in a single version for 16-bit applications that do not need to share data and a shared version to run 16-bit applications that need to share information. Each VDM is created inside the NT environment by running a 32-bit emulator program. The 32-bit agent loaded on the NT machine can detect the launch of the 32-bit emulator program, but cannot tell exactly which 16-bit application program is running inside the virtual machine. To be able to detect and manage these 16-bit application launches, the 32-bit agent process modifies the functionality of the virtual machine when it is created by injecting it with a portion of the 32-bit agent process functionality. Specifically, an application programming interface (hereafter sometimes referred to as an API) is added to the functionality of each virtual machine as it is created. This API has a function call to support queries as to which 16-bit applications are running inside the virtual machine and a function call to request termination of the execution of the 16-bit application. Each NT machine has a 16-bit agent program installed thereon which is invoked each time a virtual machine is created so as to create a 16-bit agent process running inside the virtual machine. The 16-bit agent process functions to receive identity requests via the API that was inserted into the virtual machine when was created by the 32-bit agent process. The identity requests are requests from the 32-bit agent service to identify all 16-bit applications running inside the virtual machine. In response, the 16-bit agent process returns the user identification and path of each 16-bit application which is running inside that particular virtual machine. The 32-bit agent process then uses that information to generate and send a message to the license restriction management process informing it of the launch of the identified 16-bit applications. If the license restriction management process returns an authorization message for a particular 16-bit application, the 32-bit agent service does nothing and allows the 16-bit application to continue to execute. If the return message is a denial, the 32-bit agent service sends a message to the 16-bit agent process to request termination of the 16-bit application. This message can be sent by a function call to the API or through any other Windows NT interprocess message mechanism. The 16-bit agent process then causes termination of the 16-bit application. This software architecture relieves the 16-bit agent process from the need to have functionality to communicate via TCP or UDP network protocols with the license restriction management process which substantially simplifies the 16-bit agent process. However, in alternative embodiments, the 16-bit agent processes can have this communication capability so the insertion of the API and the communications between the 32-bit agent and the 16-bit agents can be eliminated in these embodiments.

Both the 16-bit and 32-bit agents can cause termination of an application process in any of several different ways in different species within the genus of the invention, and, in some species, the manner of termination can be specified in configuration data set by the network administrator at installation time. One way is graceful exit. In this protocol, a process is terminated by simply displaying a message saying the execution is not authorized and requesting the user to save his or her data and quit the program. Another way is simply to invoke an operating system function call that causes the application program to immediately cease execution. Yet another way is to display the message requesting the user to quit the program and monitoring the task list to determine if the user actually quits the application. If, after a reasonable time, the user does not quit, as determined by periodic polling of the task list, the agent can invoke the function call of the operating system that forces the application to quit.

BRIEF DESCRIPTION OF THE DRAWINGS

FIG. 2A is a flow chart showing how 16-bit and 32-bit agents control their computers during passive monitoring mode.

FIG. 2B is a flow chart showing how the license restriction management process 34 controls its computer to react to either passive or active monitoring messages from agents or wrappers to either collect data for study by the system administrator or actively manage launches to implement a license restriction policy on the number of copies of various licensed application programs that can be running at any particular time.

FIG. 3A is a flow chart illustrating the preferred embodiment of a process carried out by an agent implementing a decentralized auto-denial license policy to kill execution of any application process in the system which is not on a list of authorized applications.

FIG. 3B is a flow chart illustrating an alternative embodiment of a process carried out by an agent and LRMP implementing a centralized auto-denial license policy to kill execution of any application process in the system which is not on a list of authorized applications.

DETAILED DESCRIPTION OF THE PREFERRED EMBODIMENT

Figure 1:
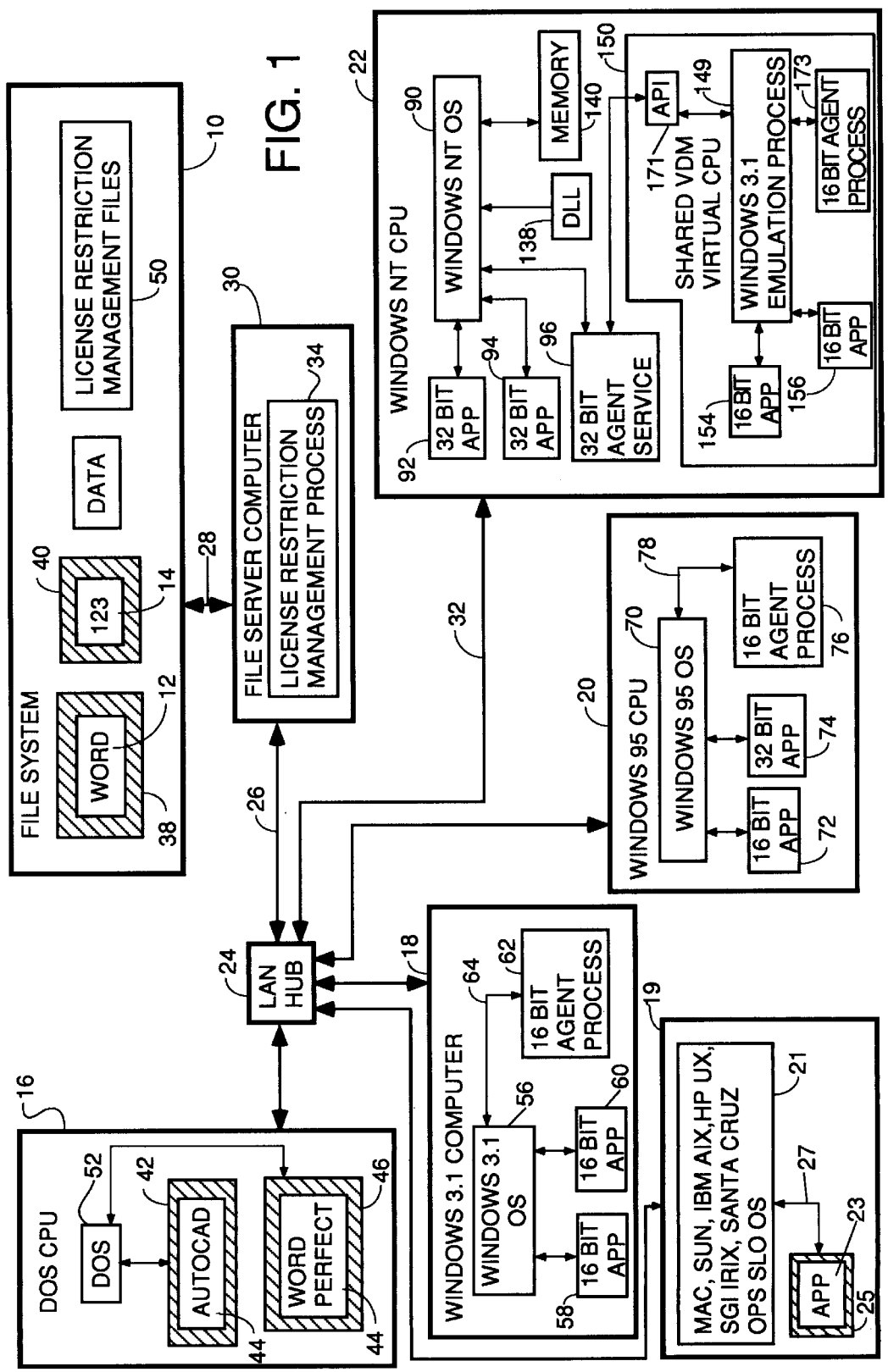
FIG. 1 is a block diagram of a typical network environment in which the system of the invention finds use.

Referring to FIG. 1, there is shown a typical network environment in which the license restriction policy management system finds use. A file server 10 stores application programs such as Microsoft Word 12 or Lotus 1-2-3 14 which can be executed from the file server by satellite workstations or desktop computers such as computers 16, 18, 20, and 22. Not shown but the presence of which is not precluded by the teachings of the invention are dumb terminals on the network which have not local hard drive storage. The satellite computers 16, 18, 20, and 22 shown all have local hard drives upon which their operating system and application programs are stored. Dumb terminals would execute application programs 12 or 14 by either downloading copies thereof into local memory in the dumb terminal via a drop line (not shown) to a network hub 24 and data paths 26 and 28 to the file system 10 via a file server computer 30. Likewise, the satellite computers are coupled to the file system 10 via individual drop lines such as drop line 32 to the LAN hub 24, data path 26, and the file server computer 30.

The file server computer 30 has a license restriction management process 34 (LRMP) in execution thereon which functions to receive messages regarding the requested launch or actual launch of various tasks and licensed applications either from the file system or from the local hard drives of the satellite computers and implement license policy. Generally, this means the license restriction management process 34 keeps a count of the number of copies of a licensed application program that are running at any particular time and manages the license restriction on the number of authorized copies by either authorizing or denying new launches of that program, but "implementation of license policy" can also mean any other process an organization wishes to carry out with regard to execution and launches of software applications within the organization such as total denial of unregistered software, monitoring of employee activity on e-mail and internet, determination of how often certain programs are used, comparison of the number of licenses for a particular program versus the number that are in execution on the average over time, etc. For example, in some embodiments, the system administrator is also interested in knowing exactly what tasks are running in the system (even ones not licensed by the enterprise of which the network is a part), how often the licensed applications and other tasks are running, whether more licenses are needed, how many upgrades to purchase etc. To support such activities, the license restriction management process 34 can also make records of launches of all tasks detected by wrappers and agents in the system for purposes of allowing the system administrator to make statistical studies and reports.

The structure of the license restriction management process 34 is not critical to the invention so long as it can receive launch and release messages and can generate and send authorization or denial messages in response to launch messages. The structure of license restriction management processes 34 are known in the art and one such license restriction management process 34 is commercially available from the assignee of the present invention and is included herewith in Software Appendix attached hereto. Any of the license management processes known in the art will suffice to practice the invention so long as they can interact with the wrappers and agents in the manner described herein. Further, although the LRMP 34 is shown in FIG. 1 as executing on only one central server, in the preferred embodiment, the LRMP is a distributed process with two types of daemons executing simultaneously. In this embodiment, there are distributed daemons executing on servers spread throughout the system that do the initial communications and which are capable of communication with agents and wrappers using as many different communication protocols as are necessary to talk to the agents and wrappers in the system. These distributed LRMP daemons are the processes which receive the initial launch request messages from the agents and wrappers. The distributed LRMP daemons then forward the launch request messages to the central LRMP daemon using a single common communication protocol. The central LRMP daemon may actually be a plurality of processes in very large installations.

Detection and management of launches of licensed applications is done by wrappers, 32-bit agent services, and 16-bit agent processes. An example of a wrapper is symbolized by the cross-hatched border 38 around the Microsoft Word® application 12. Other examples are the cross-hatched border 40 around the Lotus 1-2-3® application program 14, the cross-hatched border 42 around the Autocad® application program 44 and the cross-hatched border 46 around the WordPerfect® application 44. The structure of wrapper programs is known in the art, and wrappers are commercially available from the assignee of the present invention in predecessor versions of the product which is the subject of this patent application.

A wrapper program functions to: insert itself as a pseudo-alias into the directory in which the licensed application resides, move the licensed application to a hidden directory, intercept launch requests for that application, send a message indicating a launch request to the license restriction management process 34 and identify the application program for which the launch request was received, receive authorization or denial messages from the license restriction management process 34, and, if the launch is denied, the wrapper does not itself launch the application from the hidden directory, but if the launch is authorized, the wrapper program uses a pointer it stored to the location of the application program and launches the program. When the program so launched ceases execution, the wrapper is aware of this fact, and sends a release message to the license restriction management process 34 telling it that the number of available licenses for that particular application program should be incremented by one. For application programs that inquire of the operating system from which directory they were launched so that they can find help files, dictionaries etc., the wrapper program responds to such requests by telling the application program it was launched from the directory in which it formerly resided.

Wrapper programs work the same way whether they are resident on the central file system 10 or on the local hard drive of, for example, DOS satellite computer 16. Wrapper programs can be used on Windows 3.1™ or Windows 95® or Windows NT® computers, but they cannot detect all forms of launches such as launches by OLE® etc. This is the problem that led to the development of agent processes for use in the Windows environments. However, in some applications it may be that wrappers and agents are resident on the same machine. This will result in multiple detections of launches by both wrappers and agents of launches that wrappers are able to detect. This problem is avoided by having agents and wrappers use different handles for the same application program. Thus, the double counting problem can be avoided by counting only the handles used by the handles or only the handles used by the agents for particular application programs. In the preferred embodiment, the license restriction management process 34 avoids double counting in this circumstance by only counting the "handle" that the agent assigns the launched application and not the handle assigned by the wrapper. Wrappers and agents in such coexistence environments should have the ability to name the same application programs being managed by different handles to avoid double counting. Handles are comprised of names assigned the application based upon the user ID and the path of the application. Messages to the license restriction management process 34 from the wrappers or agents can identify the application program being launched by either the handle or the user ID and path, but in a mixed environment where wrappers and agents are coexisting on the same machine, the messages to the license restriction management process 34 should contain only handles to avoid double counting.

The license restriction management process 34 keeps any necessary data or other files to support its execution on the file server computer and to support the license management process in a set of files symbolized by block 50 entitled License Restriction Management Files.

Satellite computer 16 is shown as a DOS® operating system computer being controlled by the DOS operating system 52. The wrappers 42 and 46 send messages to and receive messages from the license restriction management process 34 by invoking functions of the DOS operating system that communicate with the network transport software layers (not shown but known) that implement the network communication protocols and hardware control of the hardware interface and physical media of the network (not shown but known).

Satellite computer 19 is a computer having an operating system 21 which can be any of the following: Macintosh, SunOS or Solaris OS, Hewlett Packard OS, SGI IRIX, IBM AIX, or Santa Cruz Operations SCO. An application program 23 is managed by wrapper program 25 via communication with the operating system by data path 27. Wrappers for the SGI IRIX, IBM AIX, and Santa Cruz Operations SCO operating systems were not commerically available or in public use by the assignee of the present invention before Jun. 21, 1996.

Satellite computer 18 is controlled by a Windows 3.1 operating system 56. 16-bit applications 58 and 60 are resident on the hard drive of satellite computer 18 and can be launched locally by any of a number of different ways peculiar to Windows 3.1. 16-bit agent process 62 detects these launches in any of a number of different ways by virtue of its communication with the operating system 56 via data path 64. Data path 64 symbolizes function calls to the OS 56 to implement whatever method of detection is being used.

Satellite computer 20 is controlled by Windows 95 operating system 70. 16-bit application 72 and 32-bit application 74 are installed on the local hard drive and can be invoked by a user of computer 20 by any one of a number of different ways provided by the Windows 95 operating system including the OLE method. The OLE method is common to both the Windows 95 and Windows 3.1 operating system and is a method of invoking an application which cannot be detected by prior art wrapper programs. It was this problem which led to the development of the prior art 16-bit agents described below. 16-bit agent process 76 uses one of the three ways described below of detecting new launches (periodic polling of the task list, new window creation, or new task creation) and for detecting the cessation of execution of applications by communication with the operating system 70 via data path 78. 32-bit agents can be used on Windows 95 computers which detect launches by periodic polling of the task list, new window creation, or new task creation, but it was found experimentally by the assignee that 32-bit agents did not reliably detect launches of 16-bit applications in the Windows 95 environment, whereas 16-bit agents did reliably detect launches of 32-bit applications in Windows 95 environments.

Both 16-bit agents 62 for the Windows 3.1 computer 18 and 16-bit agent 76 for the Windows 95 computer are intended to be the new 16-bit agent design with the new TCP/UDP, passive mode or auto-denial configuration options, although the prior art 16-bit agent design which existed before the Jun. 21, 1996 software release by the assignee would also work.

Typically, a 16-bit agent process is loaded onto each satellite computer having an operating system with which it is compatible (compatible means works reliably and does not freeze the system and can detect launches of applications by each means the operating system allows. 16-bit agent processes are typically installed only on Windows 3.1 or Windows 95 computers because they do not work on Windows NT computers). At the time a 16-bit agent is loaded, it is configured to select the way in which the agent will detect launches. For 16-bit agents that are known in the prior art (as well as the new 16-bit agent design first released commercially with the Jun. 21, 1996 release of the software product which is the subject of this patent application) and which work on Windows 3.1 and Windows 95 controlled computers, those ways are the following.

The first method used in 16-bit agents was frequent polling of the task list kept by the operating system and comparisons of each task list to the task list just previous to the most current task list. Discovery of the launch of licensed applications occurs when the task created by the operating system for the licensed application first appears on the task list. When a new task appears on the list, the agent generates and sends a message to the licensing restriction management process 34 indicating that an application has been launched. When a task disappears from the list, the agent generates and sends a release message to the licensing restriction management process 34 telling it to increment the number of available licenses for the particular application process which just terminated execution.

The second method used in 16-bit agents to detect launches is for the agent to invoke a function of a public API of the Windows operating system requesting that the operating system inform the agent each time a new window is created. Another function call of this same API is used by the agent to request that the operating system inform the agent when a window is terminated. When a new window is created, the operating system supplies a handle to the window along with the path, module name, size of the program which was launched, and the date of the launch. The agent uses the path information to determine the identity of the application that was launched, and can use the other information to confirm that the right conclusion was drawn in cases where a user changes the path of the application. When a new window is created, the agent generates and sends a message to the licensing restriction management process 34 indicating that an application has been launched and identifying the application that was launched in the window. When the window is terminated, the agent generates and sends a release message to the licensing restriction management process 34 telling it to increment the number of available licenses for the particular application process which just terminated execution.

The third way 16-bit agents detected launches was by use of a public API of the operating system to request the operating system notify the agent whenever a new task is created. When a new task is created, the operating system supplies the same information for the task as described above for detection of launches by detection of creation of a new window. When a new task is created, the agent generates and sends a message to the licensing restriction management process 34 indicating that an application has been launched and identifying the application that was launched as the new task. When the task is terminated, the agent generates and sends a release message to the licensing restriction management process 34 telling it to increment the number of available licenses for the particular application process which just terminated execution.

None of these 16-bit agent designs was sufficiently reliable or designed properly for use on Windows NT computers where 16-bit application and 32-bit applications can be running simultaneously in virtual computers having shared memory and separate memory spaces, respectively. As a result, the 32-bit agent/16-bit agent design to be described next was developed by the inventors.

The problem for agents created by the introduction of the Windows NT operating system was twofold. The first aspect of the problem for agents was that prior art 16-bit agent designs (as well as the new 16-bit agent design first released commercially with the Jun. 21, 1996 release of the software product which is the subject of this patent application) could not reliably detect launches of applications in NT systems. An NT system has a single computer, but multiple users can all share the same computer. Separate memory space is created and reserved for each process by the NT operating system so that, unlike the Windows 3.1 and Windows 95 operating systems where all processes share the same memory, a crash by one process being controlled by one user does not wipe out all other processes simultaneously running in the same shared memory space as was the case for Windows 3.1 and Windows 95 operating systems. However, it was found by the applicants that the prior art 16-bit agent designs (as well as the new 16-bit agent design first released commercially with the Jun. 21, 1996 release of the software product which is the subject of this patent application) caused system crashes when users logged on and off Windows NT systems. This is unacceptable behavior for a license restriction management system as the system is supposed to operate as smoothly and transparently as possible and should not impede the progress of users to the extent that they will not buy the system.

As a result, 32-bit agent processes were developed that could detect the launch of all 32-bit applications on NT systems which would not cause system crashes. Launches were detected in a different manner in 32-bit agents than any of the three methods described above for the prior art 16-bit agents (as well as the new 16-bit agent design first released commercially with the Jun. 21, 1996 release by the assignee of the software product which is the subject of this patent application), and choice of method was taken away in the configuration process for installation of the newly designed 32-bit agent. Only the single method of detection of the loading of AppinitDII was used for launch detection in the new 32-bit agent design.

The second aspect of the problem created for agents by the introduction of the Windows NT operating system was that NT had and still has the fundamental difference in memory management briefly mentioned above. Windows NT computers use separate address spaces for each process as opposed to the shared memory model used by the Windows 3.1 and Windows 95 operating systems. Windows 95 can run either 16-bit or 32-bit applications. 32-bit applications running on Windows 95 run in shared memory mode, but when they are run on Windows NT systems, they run in separate, protected memory space dedicated to them. 16-bit applications written for Windows 3.1 or Windows 95 expect to be run in shared memory space, and some of them want to share data with other 16-bit applications or the operating system by putting it in predetermined shared memory locations in the shared memory space. These 16-bit applications fail when running in separate memory spaces on an NT-controlled computer because each application running on an NT computer gets its own dedicated memory space which is not shared with any other application. Because Microsoft wanted to make NT backward compatible so that it could run both 16-bit applications designed for Windows 3.1 and Windows 95 systems as well as 32-bit applications designed specifically for NT systems or Windows 95 systems in separate memory spaces, a problem was created for agents. In order to make 16-bit applications run on NT computers properly, the NT operating system created VDMs or virtual computers which emulate the operation of Windows 3.1 computers. There are single VDMs in which only a single 16-bit application run or shared VDMs in which two or more 16-bit applications can run. In either type of VDM, the 16-bit applications think they are running in the Windows 3.1 operating system environment on a separate computer. The emulated Windows 3.1 computer created by Windows NT will be referred to herein as a VDM or virtual computer. These virtual computers are implemented by the NT operating system running a 32-bit emulator program.

The problem created by 32-bit emulator programs was that the 32-bit agents could detect the launch of a 32-bit emulator program but could not determine the identity of the 16-bit application(s) running inside the virtual computer. As a result the new design for agents on Windows NT computers symbolized by Windows NT computer 22 in FIG. 1 was developed. The way agents work on Windows NT computers will be described next with joint reference to FIGS. 1 and 2.

Computer 22 in FIG. 1 is controlled by a plurality of programs, chief among them being the Windows NT operating system 90. Two 32-bit application programs 92 and 94, which are designed to execute in separate memory spaces dedicated solely to them, also control computer 22 when invoked. A 32-bit agent 96 also controls computer 22 to have functionality specified below when in execution, and is set up to run as a service process. Service processes are background daemons that start up when the Windows NT operating system boots the computer and are invisible to the user in providing the monitoring and functionality that they provide.

The 32-bit agent service 96 can actually be configured upon installation or upon invoking a configuration function to operate in a visible window for purposes of debugging operation of the system. In visible mode, diagnostic statements showing launches detected, messages sent and messages received, and the content thereof can be displayed in the window so that the system administrator can verify the 32-bit agent service is working correctly. This configuration option for 32-bit agents is new for the Jun. 21, 1996 release by the assignee of the software product which is the subject of this patent application and was also incorporated into the 16-bit agents released by the assignee on Jun. 21, 1996. Some form of a visible 16-bit agent did exist in the prior art before the Jun. 21, 1996 release.

Another new configuration option for the 32-bit agent process as well as the 16-bit agents released on Jun. 21, 1996 was the ability to select either TCP or UDP communication protocols for communications with the license restriction management process 34. The TCP protocol is a connection-oriented protocol that is used in networks where the number of agents is fewer than a predetermined number which is 256 in some circumstances and 64 in others. The UDP protocol is a connectionless broadcast type protocol wherein the number of agents can be unlimited. This option is useful in very large networks with many workstations, servers, and desktop computers. This configuration option is new in 32-bit agents and is new in 16-bit agents over the prior art 16-bit agent processes which existed before the Jun. 21, 1996 release by the assignee.

Another new configuration option for the 32-bit agent service and 16-bit agent processes released by the assignee with the Jun. 21, 1996 release is election of passive monitoring. This behavior of 32-bit agents and the new behavior of the 16-bit agents forced the LRMP to also be redesigned for the Jun. 21, 1996 release so as to handle passive monitoring messages in a different way than the active license request messages were previously handled in the prior art. Behavior of the newly designed agents and LRMP in this passive monitoring mode is symbolized by the flow charts of FIG. 2A and FIG. 2B. In this mode, the agent starts and checks its configuration data and learns it is in passive monitoring mode, as symbolized by step 98. The agent then proceeds to detect launches by one of the ways described elsewhere herein such as by checking the task list or detecting the creation of a new window in the case of 16-bit agents or detecting the loading of a specific DLL in the case of a 32-bit agent (step 100). When a launch is detected, the agent sends a passive type message to the license restriction management process 34 telling it what application was launched, the identity of the user who launched it, the identity of the machine on which it was launched, and the time of launch, all as symbolized by step 100. The passive type message includes a code in the header thereof that tells the license restriction management process 34 (LRMP) that it is a passive message and no reply is expected. Referring to FIG. 2B, the LRMP receives the message from the agent, as symbolized by step 104, and checks the passive/active code in the header, as symbolized by step 106. If the message is passive, step 108 is performed to extract the identity of the application which was launched, the user ID who launched the application, the machine ID on which the application was launched, and the time of launch from the message. This data is stored in a file in the LRMP files 50 in FIG. 1. The LRMP generates no reply to any passive message from any agent. The LRMP may receive passive messages from some agents and active messages from other agents. The LRMP behaves as just described for all passive messages, but controls its computer to behave as next described for active messages.

If step 106 determines the message is active, step 110 is performed. Receipt of an active message causes the LRMP to use the application ID of the application program just launched from the message as a search key to search a list of current copy counts to find the current copy count corresponding to that licensed application program. The list of current copy counts are a plurality of counts each of which corresponds to one type of licensed application such as Word, WordPerfect, Quattro Pro, etc. The copy count indicates how many copies of the corresponding program are currently in execution somewhere in the system. The copy count for an application is incremented by the LRMP each time a new launch is authorized and decremented by the LRMP each time a message is received from an agent or wrapper for the corresponding type application that a copy of the program has stopped executing. In step 110, the LRMP checks the current copy count +1 against the number of authorized copies in a table or other list of maximum authorized copy counts which embody the license policy being enforced by the system. If the copy count +1 is less than or equal to the maxium authorized copy count for that particular type application, the LRMP generates an authorization message and sends it back to the wrapper or agent which requested the license check. If the copy count +1 is more than the maximum authorized copy count, the LRMP generates and sends a denial message.

The passive monitoring mode of operation is useful for the adminstrator to determine what software is installed on the machines in the network and to determine which software is not being used frequently or at all, which employees are spending too much time with games or on the internet, or if there is any pirate software being run, etc.

Another configuration option for the 32-bit agent service and the 16-bit agents released by the assignee on Jun. 21, 1996 is the ability to choose an automatic denial of unregistered applications. In this mode, any application programs that the enterprise of which the network is a part does not want executed on its computers are automatically denied each time a launch request is received or a launch thereof is detected. FIG. 3A is a flow diagram of the preferred embodiment of a process carried out by such a 16-bit or 32-bit agent. Step 120 represents the process wherein the agent starts and downloads from the LRMP the current list of authorized application programs. In some embodiments, the list of authorized applications is fixed and there is no need to download it since the system administrator will install the list on the local hard drive when the agent is installed. In step 122, the agent detects a launch and then determines the identity of the application launched in one of the ways described elsewhere herein for 16-bit or 32-bit agents such as by invoking API function calls to the operating system to ask for the handle of the application process just launched. Step 124 represents the process of the agent checking the identity of the application launched against the list of authorized applications downloaded from the LRMP 34. This step also represents the process of automatically terminating the unauthorized application if it is not on the list of authorized applications. This termination can be carried out by any of the methods discussed elsewhere herein. If the application is on the list, step 126 is performed to generate and send a message to the LRMP informing it of the launch and requesting that a license check be performed by the LRMP. The LRMP then performs the license check for an active message similar to the process previously described in connection with the discussion of FIG. 2B (in embodiments where passive monitoring is not possible, the check for a passive code in step 104 and steps 106 and 108 are omitted). The LRMP sends back an authorization or a denial message to the agent. If an authorization message was sent, the LRMP increments the current copy count. Step 128 represents the process carried out by the agent of terminating the application program's execution in one of the ways described elsewhere herein if the LRMP message is a denial. If the LRMP return message is an authorization, the agent does nothing and allows the application program to continue its execution. Communication to the LRMP by the agents upon termination of an application process and copy count decrementation by the LRMP when any authorized application terminates occurs in the manner described with reference to steps 190, 192, 194, 196, and 198 on FIG. 4C, and is symbolized by step 128.

FIG. 3B is a flow chart symbolizing the process carried out in an alternative embodiment for an agent and an LRMP carrying out auto-denial. In this embodiment, the agent starts and detects a launch in one of the ways described elsewhere herein, as symbolized by step 130. In step 132, the agent determines the identification of the application whose launch was detected, in any of the ways described elsewhere herein, and sends the application ID to the LRMP in a message requesting a license check with a special code signifying that this is an auto-denial request. Step 134 represents the process of the LRMP 34 receiving the auto-denial license check message and checking the identity of the application program just launched against a list of registered programs which are authorized for launch by the enterprise. If the application just launched is not on the list of authorized applications, step 134 is performed to compose and send a denial message back to the agent which then terminates the unauthorized application's execution. Step 136 represents the process wherein the application's ID is on the list of authorized applications, and the LRMP then proceeds to use the application ID to find the appropriate current count giving the number of copies of that application which are currently in execution somewhere on the system. The LRMP then checks the current count of copies of this application in step 136, and an authorization or denial message is composed based upon the result of this license count check. If an authorization message is sent, LRMP increments the copy count. The copy count is decremented by the LRMP whenever a message is received from an agent that a particular application process has terminated in the manner described with reference to steps 190, 192, 194, 196, and 198 on FIG. 4C.

Figure 4A:
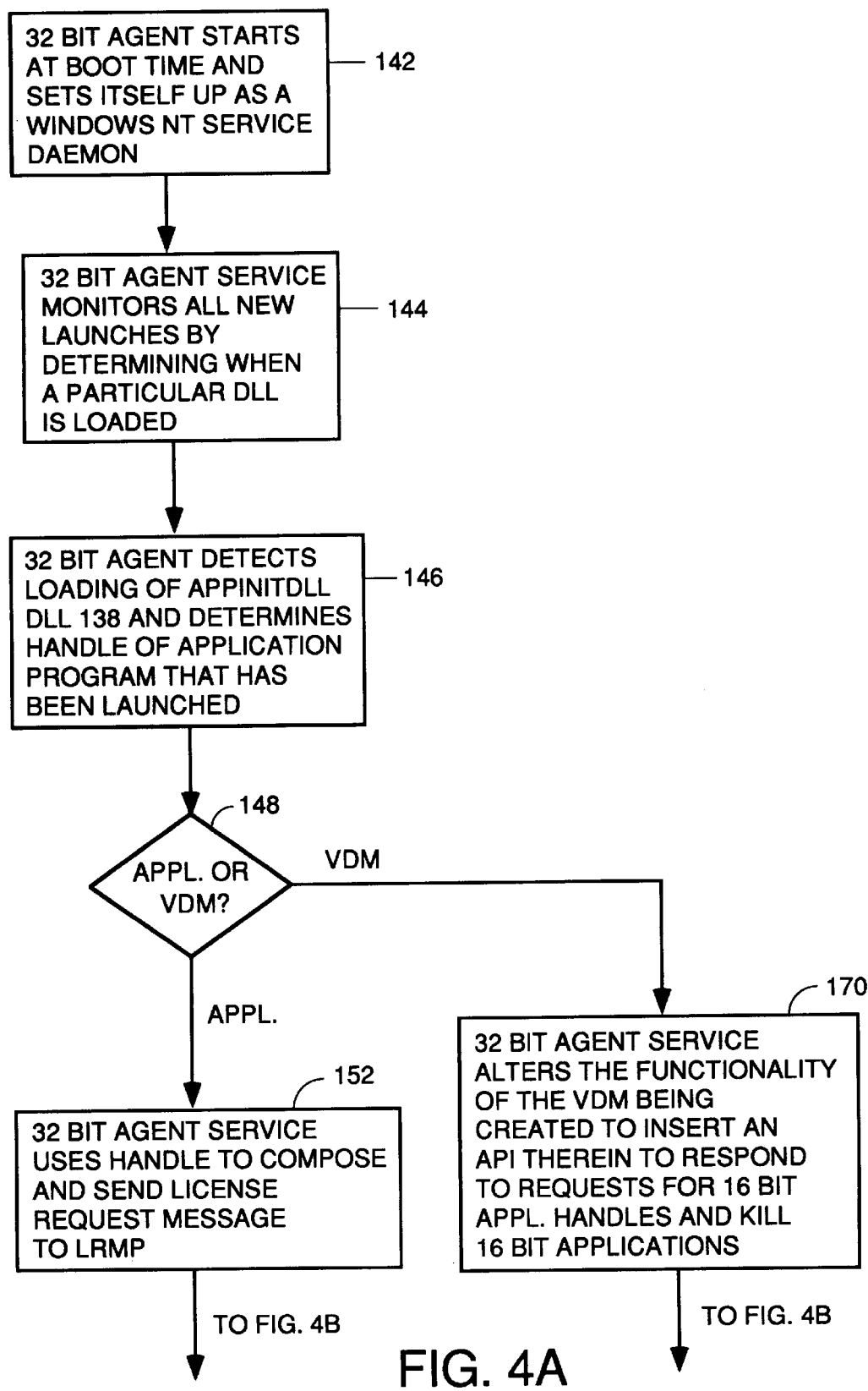
FIG. 4 is a flow chart comprised of FIGS. 4A and 4B indicating how the 32-bit agent 96 detects and manages launches of new 32-bit tasks and how 16-bit agents inside virtual machines created by Windows NT detect and manage launches of 16-bit applications running inside the virtual machines.
Figure 4B:
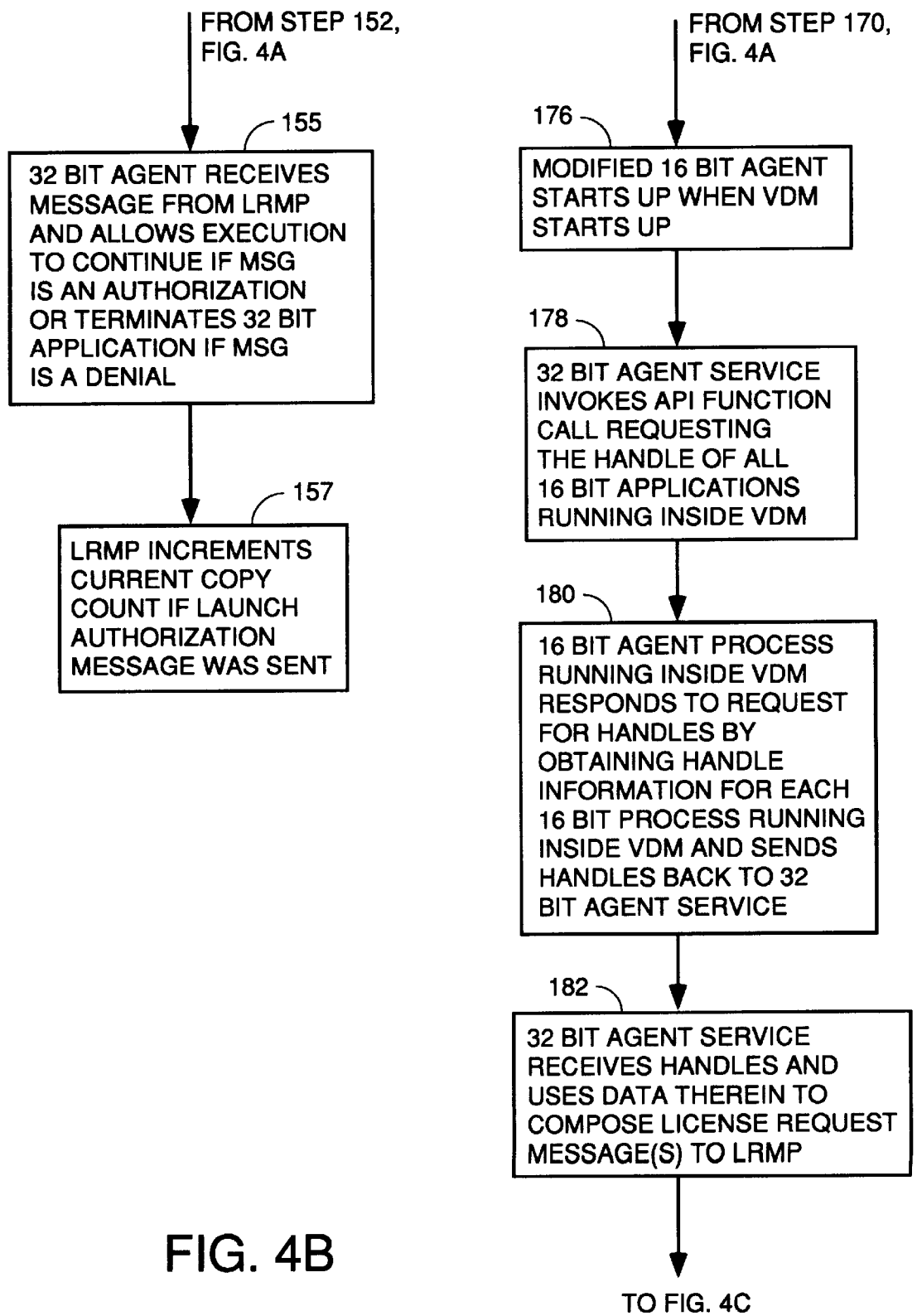
Figure 4C:
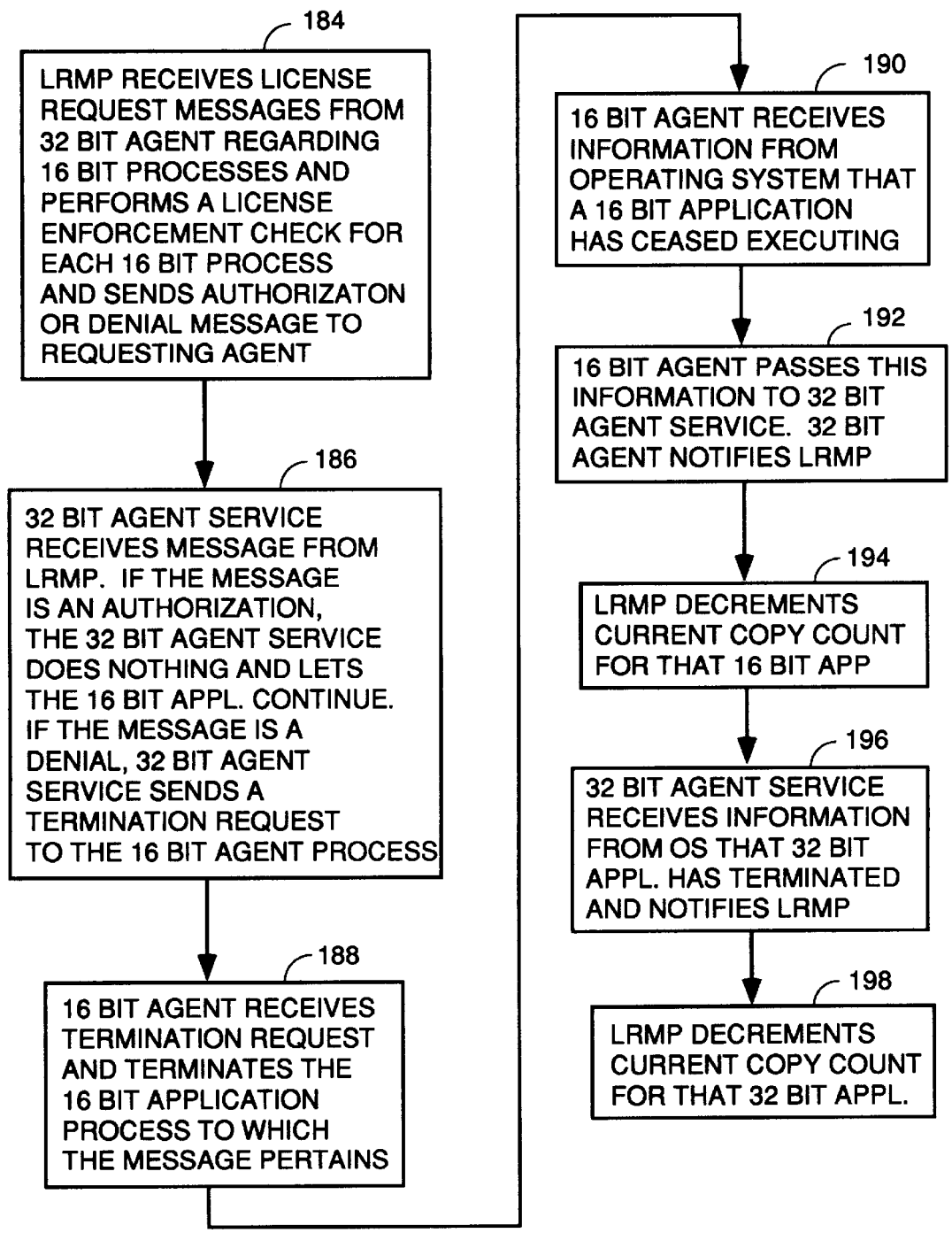

Continuing with the discussion of the structure and behavior of agent processes on Windows NT computers, reference is again made to FIGS. 1 and 4. FIG. 4 is a flow chart comprised of FIGS. 4A, 4B, and 4C indicating how the 32-bit agent 96 detects and manages 20 launches of new 32-bit tasks and how 16-bit agents inside virtual machines created by Windows NT detect and manage launches of 16-bit applications running inside the virtual machines. Step 142 of FIG. 4A represents the process of the 32-bit agent starting automatically at boot time and setting itself up as a Windows NT service daemon. In some embodiments, the administrator can start the agent remotely at times other than boot time from the file server computer or whatever machine the administrator is controlling. Step 144 represents the process carried out by the 32-bit agent service of monitoring all new launches by determining when a particular DLL (ApplnitDll) is loaded. For all new application program launches and the vast majority of new task launches, whether or not they are launched in support of an application program launch, Windows NT launches a particular Dynamic Linked Library, represented by box 138. This DLL 138 is comprised of a collection of files and programs that need to be loaded into memory 140 to provide necessary control and data support by Windows NT for the execution of any application program and most other tasks. When this DLL 138 is loaded, the 32-bit agent service detects this fact in step 146, and determines the handle of the 32-bit application that was launched which caused the ApplnitDll to be loaded. The handle of the application program can be simply a number which is unique to the particular application, or it can be a collection of the application program's ID, the user ID of the user who launched it, the size of the application, the machine ID on which it was launched, and the time of the launch. This handle information is kept by the Windows NT operating system and is made available to the 32-bit agent service by invoking a plurality of function calls of a public API of the NT operating system to request the information. In the preferred embodiment, the 32-bit agent service invokes a first API function call to obtain the application process ID and then invokes other API functions to obtain the other information of the handle for use in composing the license request message to the LRMP. In alternative embodiments, the 32-bit agent service invokes a single function call about an API of the operating system to ask that it be informed whenever the particular DLL 138 (ApplnitDII) is loaded and that the operating system supply the handle of the application program or task which was launched that caused the loading of the DLL. This will result in automatic supplying by the operating system to the 32-bit agent service of all information in the handle. Step 146 represents any process for handle determination in whatever manner is native to the operating system where the agent detects launches of applications by the DLL load detection method.

Step 148 represents the process carried out by the 32-bit agent service of determining from the handle of the 32-bit process that was launched whether the 32-bit process being launched is an application program or a 32-bit emulator program executed by NT to create a VDM or virtual computer. VDM or virtual computers such as VDMs 150 in FIG. 1 are virtual computers having a process emulating a Windows 3.1 environment, symbolized by block 149 in FIG. 1, inside which one or more 16-bit application programs will run in shared memory mode. 16-bit application programs 154 and 156 in FIG. 1 are examples of programs designed to run on Windows 3.1 computers having shared memory which are executing on a Windows NT separate memory machine 22 inside a shared VDM. Windows 95 application programs are run directly under the Windows NT operating system, and launches thereof are detected by the 32-bit agent service 96 through the detection of loading of the AppinitDII 138 as if they were 32-bit applications written specifically for Windows NT.

If the 32-bit agent service determines in step 148 on FIG. 4B that the 32-bit application launch which caused the loading of the DLL 138 was a 32-bit application program, as opposed to a 32-bit emulator program, step 152 is performed. There, the 32-bit agent service uses the handle of the 32-bit application to compose a message to the LRMP and sends the message to the LRMP coded as an active mode license request message. The LRMP does an active mode license check as described in connection with FIG. 2B and sends back an authorization or denial message. Finally, in step 155, the 32-bit agent reacts to the authorization or denial message from the LRMP by allowing the 32-bit application to continue executing if an authorization is received and terminating the 32-bit application in one of the ways described elsewhere herein if the message is a denial.

Step 157 represents the process carried out by the LRMP of incrementing the current copy count corresponding to the 32-bit application whose launch was just authorized by an authorization message.

Returning to the consideration of step 148 in FIG. 4A, if the handle determined in step 146 is the handle of a VDM 32-bit emulation process, processing branches to step 170. This step symbolizes the process of the 32-bit agent participating in the creation by Windows NT of the virtual computer by injecting therein an API, symbolized by block 171 in FIG. 1. This API provides availability of function calls which can be invoked by 32-bit agent service 96 in FIG. 1 to request a 16-bit agent process symbolized by block 173 in FIG. 1, to determine the handles of any 16-bit applications running inside the virtual computer 150. The API also provides another function call which may be invoked by the 32-bit agent service 96 to request the 16-bit agent service to terminate the execution of specified 16-bit application processes. Each VDM that is created by Windows NT is altered in this way by the 32-bit agent process so as to have such an API and to have a 16-bit agent which starts up with the start up of the emulator program which creates the virtual machine.

Step 176 of FIG. 4A represents the process of starting up a modified 16-bit agent process, symbolized by block 173 in FIG. 1, inside the virtual computer 150 as the virtual computer is created. The 16-bit agent 173 is modified from the prior art 16-bit agents in that it has no capability to communicate directly with the LRMP process using either TCP or UDP communication protocols (in alternative embodiments, the 16-bit agent process 173 can communicate directly with the LRMP), and it has the ability to respond to function calls made to the API 171 by the 32-bit agent process in the manner described below.

Step 178 represents the process carried out by the 32-bit agent service 96 of invoking a function call of the API 171 to request the handles of all 16-bit applications running inside the virtual computer 150.

In response to the request from the 32-bit agent via the API for handles, in step 180, the 16-bit agent process 173 running inside the virtual computer queries the emulated Windows 3.1 operating system for the handles of all 16-bit processes running inside the virtual computer using one or more function calls of a Windows 3.1 API which is emulated by emulation process 149. When these handles are received, they are transmitted by the 16-bit agent process 173 to the 32-bit agent service 96. Transmission of this data can be through the API or through other Windows NT interprocess communication paths. The data transmitted to the 32-bit agent regarding the handles of the 16-bit processes running inside the virtual computer also identifies within which of the plural possible virtual computers each 16-bit processes is executing. This helps the 32-bit agent direct authorization and denial messages regarding the 16-bit processes to the proper virtual computers and is helpful in getting the authorization and denial messages to the proper virtual computer in the situation where multiple 16-bit processes in different virtual computers are simultaneously launched.

Step 182 represents the process carried out by the 32-bit agent service of receiving the handle information from the 16-bit agent process and using the data therein to compose a license request message to the LRMP for each 16-bit process for which handle information was received.

Step 184 on FIG. 4C represents the process carried out by the LRMP in response to each license request message received from the 32-bit agent service regarding a 16-bit application launch. The LRMP uses the handle information of each 16-bit process to perform a license enforcement check for that 16-bit application. Specifically, the 16-bit application ID is used as a search key to find the current copy count corresponding to that particular 16-bit application. The current copy count +1 is then compared to the maximum authorized copy count stored in a license policy restriction table kept by the LRMP. If the current copy count +1 is less than or equal to the maximum copy count, an authorization message is sent by the LRMP to the requesting agent and the current copy count is incremented by one. If the current copy count +1 is greater than the maximum copy count, a denial message is sent by the LRMP to the requesting agent, and the current copy count is left as it was found.

The 32-bit agent service 96 receives the authorization or denial message from the LRMP. If the message received from the LRMP is an authorization, the 32-bit agent service does nothing since the 16-bit application is already launched and its execution will be permitted to continue. If the message received from the LRMP is a denial, the 32-bit agent service 96 sends a message to the 16-bit agent process 173 requesting termination of the 16-bit application process to which the message pertains. Step 186 symbolizes the above described process. The termination request can be sent by one of the Windows NT interprocess communication paths or by invoking a function of the API 171.

Step 188 symbolizes the process of the 16-bit agent receiving the message from the 32-bit agent service requesting termination and reacting thereto by terminating the 16-bit application process to which the message pertains. Termination can be graceful wherein the 16-bit agent process requests the user to save his or her data and quit the program, or it can be not graceful in invoking an API function of the Windows 3.1 emulation process 149 to force the 16-bit application to quit. Preferably, the termination process gives the user a displayed warning message that the application is going to be terminated shortly thereby giving the user enough time to save his or her file and quit the program. The 16-bit agent process starts a timer at the time the warning is given, and then forces the application to quit if the timer times out and the user has not yet voluntarily quit the application.

Step 190 symbolizes the process wherein the 16-bit agent process 173 receives notification that a 16-bit process running inside a virtual computer has ceased executing. This notification can be received by periodically checking the task list kept by the operating system, invoking an API function of an API within the emulated Windows 3.1 environment to request notification of the closing of the window in which the 16-bit application process was running or requesting notification of the ending of a task etc. The manner in which the 16-bit agent process 173 learns of the cessation of execution of the 16-bit application process is not critical to the invention.

Step 192 symbolizes the process carried out by the 16-bit agent process 173 of passing the information about which 16-bit application has terminated to the 32-bit agent service 96. This can be done through the API 171 or through a Windows NT interprocess communication path, and the details of how this communication is accomplished are not critical to the invention. The 32-bit agent service 96 then sends a message to the LRMP indicating which 16-bit application process terminated.

In step 194, the LRMP uses the identity of the 16-bit application which terminated to locate the current copy count associated with that 16-bit application and decrements the count by one.

Step 196 represents the process of the 32-bit agent service receiving information from the NT operating system that a particular 32-bit application has terminated. The details of how the 32-bit agent service obtains this information are not critical to the invention, but the information is usually obtained by invoking a function of a public API of the NT operating system to request notification when a task is ended. This function is typically invoked when loading of the DLL 138 is detected and functions of the API are invoked to request items of information identifying the particular 32-bit application that was launched that caused the DLL to be loaded. In response to the request through the API for notification when a particular task is ended, the NT operating system returns the identity of the application process which just terminated when the application stops executing. Step 196 also symbolizes the process of the 32-bit agent service sending a message to the LRMP indicating that a particular 32-bit application process just terminated.

Step 198 represents the process carried out by the LRMP of receiving the termination message and using the ID of the 32-bit application contained in the message to locate the current copy count for that 32-bit application and decrementing it by one.

The advantage of the configuration of agents described above for NT machines is that the 16-bit agents inside the virtual machines do not need to have any code with the capability of communicating with the LRMP 34 using the TCP or UDP communication protocol so they are simpler in design. However, in alternative embodiments, the NT agent configuration can be a 32-bit agent and a 16-bit agent process running inside each virtual machine, each of the 32-bit and 16-bit agents being capable of communication directly with the LRMP and capable of acting upon denial messages from the LRMP to shut down 32-bit and 16-bit applications, respectively. In other words, in an important class of alternative embodiments, the 16-bit agents can talk directly with the LRMP without the need of going through the 32-bit agents.

What is claimed is:

1. An article of manufacture comprising:
    a computer-readable medium having stored thereon a computer program for controlling one or more computers such that license restrictions on the number of copies of a licensed application program that can be simultaneously executing can be managed, said computer program comprising:
        a first code segment for controlling one or more computers to carry out a license restriction management process of receiving messages regarding launch requests for licensed applications, determining if each launch request is authorized and sending back an authorization or denial message to a requesting process;
        a second code segment for controlling one or more computers being controlled by a 32-bit operating system to carry out a 32-bit agent service by detecting at least some task launching activities on said computer including detection of launching of each 32-bit licensed application by whatever method of invocation is used to launch said licensed applications, said detection of launching of 32-bit licensed applications being performed by detection of loading of a predetermined Dynamic Linked Library, and, when said predetermined Dynamic Linked Library is loaded, sending a message to said license restriction management process informing it of the launching of at least each 32-bit licensed application, receiving an authorization or denial messages from said license restriction management process for each request to launch a 32-bit licensed application, and allowing continued execution of said 32-bit licensed application if said received message is an authorization and stopping execution of said 32-bit licensed application if said received message is a denial, said second code segment also for controlling said computer to alter each virtual 16-bit operating system emulation process which is launched to make one or more of said computers emulate a computer which is controlled by a 16-bit operating system, hereafter referred to as a virtual machine process such that said virtual machine process has a 16-bit agent application programmatic interface which can receive inquiries regarding the user name and path of each 16-bit licensed application being executed by said virtual machine process;

a third code segment for controlling one or more computers being controlled by a 32-bit operating system to carry out a 16-bit agent process which is initiated each time a virtual machine process is launched, said 16-bit agent process controlling said one or more computers to respond to function calls made through said 16-bit agent application programmatic interface to give the user name and path for each 16-bit licensed application executing under said virtual machine process by obtaining the user name and path of each 16-bit licensed application executing under said virtual machine process and sending a message including said user name and path to said 32-bit agent service executing on said one or more computers, and controlling said one or more computers to stop execution of a 16-bit licensed application if a message to that effect is received by said 16-bit agent process from said 32-bit agent service, said 32-bit agent service controlling said one or more computers to:

receive said message from said 16-bit agent process and use the information therein to send a message to said license restriction management process identifying all 16-bit licensed applications that have been launched on said one or more computers controlled by said 32-bit operating system;

receive authorization or denial messages from said license restriction management process;

if said message is an authorization, allowing said 16-bit licensed application to continue executing; and if said message is a denial, controlling said computer to send a message to said 16-bit agent process instructing it to stop the execution of said 16-bit licensed application which was denied.

2. A process carried out on one or more computers controlled by an operating system of a first type designed to control the computer on which said operating system is resident, hereafter referred to as the resident computer, so as to execute both native and non-native programs, where native programs are programs which are designed to run on said resident computer under control of said operating system of said first type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was designed to run, comprising:

detecting when a particular event occurs which said operating system causes to occur whenever a native program is launched and determining the user name and path of the native application program which was launched;

sending a message to a licensing restriction management process in execution on one or more computers informing said licensing restriction management process of the user name and path of the native application program which has been launched;

receiving a message back from said licensing restriction management process which affirms or denies authorization for the launch of said native application program;

if the message received from said licensing restriction management process affirms the launch of said native application program, allowing execution of said native application program to continue; and if the message received from said licensing restriction management process denies the launch of said native application program, causing said native application program to cease execution.

3. The process of claim 2 wherein the step of causing said native application program to cease execution comprises the steps of displaying a message requesting a user to terminate execution of said denied native application program.

4. The process of claim 2 wherein the step of causing said native application program to cease execution comprises the steps of invoking a function of said operating system which forces the denied native application program to stop executing.

5. An article of manufacture comprising:

one or more computer-readable medium having stored thereon one or more license policy enforcement computer programs for controlling one or more computers to implement a license policy enforcement process, said one or more computers being any of one or more different types or any of a plurality of computers of the same type but controlled by different operating systems, where a first type of computer is a computer controlled by an operating system designed to control the computer on which said operating system is resident, hereafter referred to as the resident computer, so as to execute both native and non-native programs, where native programs are programs which are designed to run on said resident computer under control of said operating system of said first type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was designed to run, said license policy enforcement computer programs controlling said computers and said virtual computer processes such that license restrictions on the number of copies of a licensed application program that can be simultaneously executing on one or more of said computers can be managed to implement said license policy enforcement process, said one or more license policy enforcement computer programs comprising:

a first code segment for controlling one or more computers to help carry out said license policy enforcement process by receiving messages regarding launches or launch requests for licensed application programs, determining if each launch request is authorized and sending back an authorization or denial message to a requesting process;

a second code segment for controlling one or more computers to implement a wrapper protocol by intercepting a launch request attempting to invoke a licensed application program to execute on a computer, and in response to said interception, sending a message to said license policy enforcement process requesting permission for launch of the licensed application, and for controlling said one or more computers to receive one or more messages containing an authorization or a denial from said license policy enforcement process, and invoking said licensed application program if an authorization is received, or blocking the launch of said licensed application if a denial is received;

a third code segment for controlling one or more computers to carry out an agent service process by detecting at least one or more task launching activities carried out on a computer by the operating system whenever an application program covered by said license enforcement policy is launched, hereafter referred to as a licensed application programl including detection of launching of each licensed application by and controlling one or more computers to respond to said detection of a launch by sending a message to said license policy enforcement process informing it of each said launch and controlling said computer to receive an authorization or denial message from said license policy enforcement process for each launch of a licensed application program, and controlling said one or more computers to allow continued execution of said licensed application program if said received message is an authorization and controlling said computer to stop execution of said licensed application program if said received message is a denial;

a fourth code segment for controlling one or more computers of said first type being controlled by said operating system to carry out an native program agent service process functioning to detect at least one or more task launching activities carried out on said computer by said operating system whenever a native program is launched, said one or more task launching activities being such that they will cause detection by said native program agent service process of the launch of any native program, and, upon detection of launch of a native program, controlling said computer to send a message to said license policy enforcement process informing it of said launch, and controlling said computer to receive an authorization or denial messages from said license policy enforcement process for each launch of a native program, and controlling said computer to allow continued execution of said native program if said received message is an authorization and controlling said computer to halt execution of said native program if said received message is a denial, said fourth code segment also for controlling said computer to alter each said virtual computer process which is launched by said operating system such that said virtual computer process has an agent application programming interface which provides function calls which include at least a first function call to invoke a program which can terminate the execution of any specified non-native program executing in said virtual computer process and a second function call which can receive inquiries from said native program agent service process regarding the user name and path of each non-native program being executed under said virtual computer process and respond thereto by determining and sending back to the inquiring process said user name and path of each said non-native program which is in execution by said virtual computer process, said fourth code segment also for controlling one or more computers to invoke said first function call to determine which non-native programs are in execution and send a message to said license policy enforcement process requesting authorization for execution of each said non-native program in execution, and to receive any authorization or denial message for each said non-native program, and upon receipt of a denial message, controlling said computer to invoke said second function call to invoke a program to halt the execution of the non-native program for which the denial message was received.

6. A process comprising:

controlling one or more computers with a computer program that cooperates with an operating system program to carry out a license restriction management process which receives messages regarding launch requests for licensed applications or actual launches thereof, determines if each launch request or launch is authorized in accordance with a predetermined license restriction policy and sends back an authorization or denial message to a requesting process, at least some of said one or more computer being controlled by a first type operating system capable of controlling said computer upon which it is resident, hereafter referred to as the resident computer, so as to execute native programs which have been specifically designed to operate with said operating system of said first type and said resident computer as well as to execute foreign programs which have not been specifically designed to operate with said first type operating system or said resident computer, execution of said foreign programs on said resident computer implemented by launching one or more emulation programs which control said computer to implement a virtual computer process which emulates the processing by a computer and operating system which the foreign program was specifically designed to control;

controlling one or more computers also being controlled by said first type operating system to carry out an agent service process functioning to detect the launch of any native program by detecting at least one native program launch event carried out on said computer by said first type operating system whenever a native program is launched such as by detecting the loading of a predetermined Dynamic Linked Library, and, when said native program launch event is detected, determining the identity of the native program that has been launched and sending a message to said license restriction management process informing it of the identity of the launched native program and controlling said computer to receive authorization or denial data from said license restriction management process for each launch, and allowing continued execution of said launched native application program if said received message is an authorization and controlling said computer to halt execution of said launched native program if data received from said license restriction management process indicates execution of the launched native application program is unauthorized, and controlling said computer to alter each virtual computer process which is launched by said first type operating system such that said virtual computer process has an agent application programming interface which provides at least a first function call which can be invoked to launch a program which can receive inquiries regarding the identity of each foreign application program being executed under said virtual computer process and which provides at least a second function call which can be invoked to control said computer to halt execution of a named foreign application program in execution in a virtual computer process; and controlling one or more computers also being controlled by said first type operating system to implement a foreign agent process capable of being invoked by either said first or second function calls of said application programming interface, and controlling said one or more computers such that said application programming interface that controls said foreign agent process is created each time a virtual computer process is created, said foreign agent process structured to control said one or more computers to respond to receipt of said first function call made through said application programming interface of said virtual computer process to determine the identity of any foreign application program or programs being executed by said virtual computer process and send a message including said identity or identities to said agent service process executing on said one or more computers that made said first function call, and structured to control said one or more computers in response to receipt of a second function call made through said application programming interface to stop execution of a foreign application program identified in said second function call, and wherein said agent service process also functions to control said one or more computers to:

invoke said first function call of said application programming interface anytime a virtual computer process is created to cause said foreign agent process to determine the identity of any foreign program in execution on said virtual computer process;

receive said message from said foreign agent process and use the identity information therein to send a message to said license restriction management process identifying all foreign programs that have been launched and request authorization for said launches;

receive authorization or denial messages for said foreign programs that are being executed by one or more virtual computer processes from said license restriction management process;

if said message is an authorization, allowing said foreign program to continue executing; and if said message is a denial, controlling said computer to invoke said second function call of said application programming interface to cause said foreign agent process to stop the execution of the foreign program named in said function call.

7. An apparatus comprising:

a network;

one or more file servers;

one or more computers of different types, at least one type of computer being controlled by an operating system of a first type designed to control the computer on which said operating system is resident, hereafter referred to as the resident computer, so as to execute both native and non-native programs, where native programs are programs which are designed to run on said resident computer under control of said operating system of said first type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was designed to run, and coupled to said file servers by said network and having local memory;

and wherein said file server has in execution thereon a license restriction management process which receives messages regarding launch requests for licensed applications to be executed by said workstations either from said file server or from local memory, and determines if each launch request is authorized in accordance with a predetermined license restriction policy and sends back an authorization or denial message to a requesting process;

and wherein said one or more computers being controlled by said operating system of said first type is programmed to have an agent service process in execution thereon when said one or more computers are running which controls said one or more computers to carry out the following functions:

detect launches of native and non-native application programs by monitoring for the occurrence of a predetermined event carried out by said operating system each time a native or nonnative application program is launched, and when said predetermined event occurs, determine the identity of the native application program which has been launched, and send a message to said file server requesting confirmation or denial of the launch from said license restriction management process, and terminates the launch of said native or non-native application program when a denial message is received from said license restriction process.

8. An apparatus comprising:

a network;

one or more file servers;

one or more computers of different types, each being controlled by an operating system at least some of said operating systems being of a first type designed to control the computer on which said operating system is resident, hereafter referred to as the resident computer, so as to execute both native and non-native programs, where native programs are programs which are designed to run on said resident computer under control of said operating system of the first type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was designed to run, said one or more computers of different types coupled to said file servers by said network and having local memory;

and wherein said file server has in execution thereon a license restriction management process which receives messages regarding launch requests for licensed applications to be executed by said one or more computers either from said file server or from local memory, and determines if each launch is authorized in accordance with a predetermined license restriction policy and sending back an authorization or denial message to a requesting process;

and wherein said one or more computers being controlled by said operating system of said first type has a native program agent service in execution thereon which controls said one or more computers to:

detect launches of native programs by monitoring for the occurrence of a specific, predetermined launch event which always occurs when any native program is launched, and when said launch event occurs, determine the identity of the native program that was launched, and request confirmation or denial of the launch from said license restriction management process, and terminate execution of said native program when a denial message is received from said license restriction management process, and detect when first type operating system invokes one or more emulation programs to create one or more standalone or shared virtual computers in support of execution of one or more non-native programs, and alter the functionality of each said virtual computer to create therein an application programming interface which provides a first function call which functions to invoke a program to answer queries as to the identity of any non-native program executing on said virtual computer and which provides a second function call which invokes a program to terminate the execution of any non-native program named in the argument of said second function call, receive one or more messages through said application programming interface of a virtual computer regarding the identity of any non-native programs in execution within said virtual computer and request from said license restriction management process confirmation or denial for continued execution of the non-native program or programs identified in said messages, if a denial message is received from said license restriction management process, invoke said second function call of said application programming interface to force cessation of execution of the a non-native program executing within said virtual computer named in the argument of said second function call.

9. A process comprising:

controlling one or more computers to carry out a license restriction management process which receives messages regarding launch requests or launches that have already occurred for licensed applications, determines if each launch request is authorized in accordance with a predetermined license restriction policy and sending back an authorization or denial message to a requesting process;

controlling one or more computers with an agent program also being controlled by an operating system of a flexible, multitasking first type designed to control the computer on which said operating system is resident, hereafter referred to as the resident computer, so as to execute both native and non-native programs, where native programs are programs which are designed to run on said resident computer under control of said operating system of said first type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was designed to run, said agent program controlling said resident computer to carry out an agent service to detect at least some task launching activities on said computer carried out by said operating system whenever a new computer program is invoked into execution, including detection of launching of each native licensed application by whatever method of invocation is used to launch said native licensed applications, and when such a task launching activity is detected, said agent program also functioning to control said computer to send a message to said license restriction management process informing it of the launching of a licensed application, said agent program also controlling said computer to receive an authorization or denial message from said license restriction management process for each request to launch or actual launch of a native licensed application, and controlling said computer to allow continued execution of said native licensed application if said received message is an authorization and controlling said computer either directly or by invoking a function call of said operating system to halt execution of said native licensed application if said received message is a denial, said agent process also controlling said one or more computers to detect when said one or more emulation programs have been launched to create a virtual computer and participate with said operating system in creation of said virtual computer by creating in said emulation process an application programming interface which provides a first function call which can be invoked to determine the identity of any non-native application programs being executed by said virtual computer and a second function call which can be invoked to cause any non-native application programmed named in the argument of said second function call, said application programming interface implemented by coupling said emulation process to a library of one or more programs including a non-native agent process to control said resident computer to carry out the functions assigned to each function call; and controlling one or more computers also being controlled by an operating system of said flexible multitasking first type with a non-native agent program to carry out a non-native agent process which is initiated each time said emulation programs are launched to create a virtual computer said non-native agent process controlling said one or more computers to respond to invocation of said first function call by said native agent process by retrieving the identity for each nonnative licensed application being executed by said virtual computer and sending a message including said identity to said native agent process which responds by controlling said one or more computers to send a message to said license restriction management process requesting authorization or denial for execution of the non-native application program named in the message from said non-native application program, said native agent controlling said one or more computers to receive authorization or denial messages from said license restriction management process, and controls said one or more computers to invoke said second function call to cause said non-native agent process to stop execution of any non-native licensed application if a denial message naming said non-native application is received by said native agent process from said license restriction management process but controlling said computer to do nothing so as to allow continued execution of said non-native application process if said received message is an authorization.

10. An article of manufacture comprising:

a computer-readable medium having stored thereon a computer program for controlling one or more computers such that license restrictions on the number of copies of a licensed program that can be simultaneously executing can be implemented, said computer program comprising:

a first code segment for controlling one or more computers to carry out a license restriction management process comprising at least the steps of receiving messages regarding launch requests or actual launches for licensed programs, determining if each launch or launch request for a licensed program is authorized and sending back an authorization or denial message to a requesting process;

a second code segment for controlling one or more computers being controlled by a flexible, multitasking first type operating system designed to control the computer on which said operating system is resident, hereafter referred to as the resident computer, so as to execute both native and non-native programs, where native programs are programs which are designed to run on said resident computer under control of said operating system of said first type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was designed to run, said second code segment controlling said computer to carry out an agent service by detecting at least one task launching activity carried out on said resident computer whevever either a native or non-native program is and when said task launching activity is detected, determining if the program launched is a native program or an emulation program to set up a virtual computer, and if the program launched is a native program, determining its identity and sending a message to said license restriction management process informing it of the launching of said native program, and controlling said one or more computers to receive an authorization or denial message from said license restriction management process for each request to launch or actual launch of a native program, and allowing continued execution of said native program if said received message is an authorization and stopping execution of said native program if said received message is a denial, said second code segment also for controlling said resident computer to create in each virtual computer an application programming interface when it is determined that the task which caused said task launching activity to be performed is the launching of said one or more emulation programs, said application programming interface having a first function call which can be invoked to determine the identity of any non-native program being executed by said emulation process, and a second function call which can be invoked to cause termination of execution of any non-native program being executed by said emulation process and named in the argument supplied to said second function call;

a third code segment for controlling one or more computers also being controlled by a flexible, multitasking first type operating system capable of executing either native or non-native programs, said third code segment for controlling said one or more computers to carry out a non-native agent process to carry out the functions of said application programming interface, said non-native agent process controlling said one or more computers to respond to invocation of said first function call by retrieving the identity of each non-native program being executed by said virtual computer and said third code segment also for controlling said one or more computers to respond to invocation of said first function call by sending a message to said native agent process including said identity of said non-native program, and wherein said native agent process established by said second code segment controls said one or more computers to send a message to said license restriction management process requesting authorization for said launch of each non-native program identified by said non-native agent process, said native agent process also for controlling said one or more computers to receive authorization or denial messages from said license restriction management process, and to invoke said first function call to cause said non-native agent process to stop execution of a a named non-native program if a denial message is received but to allow continued execution of said non-native program if said received message is an authorization.

11. An apparatus comprising:

a network;

one or more file server computers controlling access to a file system;

one or more workstation computers being controlled by a flexible, multitasking operating system of a first type designed to control the computer on which said operating system is resident, hereafter referred to as the resident computer, so as to execute both native and non-native programs, where native programs are programs which are designed to run on said resident computer under control of said operating system of said first type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was design to run, each of said one or more workstation computers coupled to said file servers by said network and having local memory;

and wherein said file server has in execution thereon a license restriction management process which receives messages regarding launch requests for licensed applications to be executed by said workstations either from said file server or from local memory, and determines if each launch request is authorized in accordance with a predetermined license restriction policy and sends back an authorization or denial message to a requesting process;

and wherein said one or more computers being controlled by said flexible multitasking operating system of said first type has in execution thereon a native program agent service which controls said one or more computers to:

detect launches of native programs by monitoring for the occurrence of a specific predetermined event which always occurs each time either a native program is launched or said one or more emulation programs are launched, and, when said predetermined event is detected, said native program agent service controls said one or more computers to determine the identity of the native program that was launched, and if one or more emulation programs are launched, for controlling said one or more computers to create in said virtual computer an application programming interface which provides a first function call which can be invoked to determine the identity of any non-native application programs that are being executed by said virtual computer and provides a second function call which can be invoked to cause termination of any non-native program named in the argument supplied when said second function call is made, and request confirmation or denial of the launch or requested launch of said native program from said license restriction management process, and block launching of said native program or cause said native program to cease execution when a denial message is received from said license restriction management process, and and wherein each of said one or more virtual computers created by said flexible, multitasking operating system of said first type has in execution therein a non-native program agent process which controls one or more computers to:

respond to invocation of said first function call by determining and transmitting to said native program agent service the identity of each said non-native application program in execution within said virtual computer, and wherein said native program agent service responds to receipt of this message by sending to said license restriction management process a message requesting authorization for launch of said non-native application program, and wherein said native program agent service controls said computer to receive any authorization or denial message transmitted by said license restriction management process and invoke said second function call if said message received from said license restriction management process is a denial, and if a message is received from said native program agent service denying continued execution of said non-native program as indicated by invocation of said second function call, said non-native program agent process controls said one or more computers to cause any non-native program identified in the argument supplied when said second function call was made to cease execution.

12. The apparatus of claim 11 wherein said native program agent service is structured so as to allow a configuration option to be selected to cause said native program agent service to control said computer being controlled by said operating system so as to request confirmation or denial of the launch from said license restriction management process using either a TCP or a UDP communication protocol.

13. An apparatus comprising:

a network;

one or more file server computers controlling one or more file systems;

one or more computers being controlled by an operating system of a first type designed to control the computer on which said operating system is resident, hereafter referred to as the resident computer, so as to launch programs in a number of different ways including at least one way which cannot be detected by a wrapper program, and which runs each application program in its own window, and which controls said resident computer to keep a task list of all the programs that are running, and which controls said computer to provide an application programmatic interface which provides at least a first function call which can be invoked to request notification each time a new program is launched and a new task is created on said task list and a second function call which can be invoked to request notification each time a new window is created, or which are controlled by any of a plurality of other diverse operating systems which launch application programs in a way which can be detected by wrapper programs, and coupled to said file servers by said network and having local memory;

and wherein said one or more file server computers have in execution thereon a license restriction management process which receives an active or passive monitoring message regarding a launch request or actual launch of a licensed application program, where an active monitoring message originates from either an agent process or a wrapper program, and wherein a passive monitoring message is generated either by a wrapper or an agent program and merely reports a launch without requesting permission for said launch, said launch or requested launch being either from a file system controlled by a file server or from local memory of a computer, said license restriction management process, if the message is a active monitoring message, controlling said one or more file server computers to determine if said launch request or actual launch is authorized in accordance with a predetermined license restriction policy and sending back an authorization or denial message to a process which sent said message, or if the message is a passive mode monitoring message, controlling said one or more file server computers or one or more other computers to record data regarding said launch or requested launch;

and wherein said one or more computers controlled by any of said plurality of other diverse operating systems which launch application programs in a way which can be detected by wrapper programs have one or more application programs installed thereon the launching of which is controlled by one or more wrapper programs which function to control said one or more computers to:

move the application program being managed by said wrapper program to a hidden directory and insert said wrapper program into the directory in which said application program being managed was formerly stored;

intercept launch requests for the application program being managed by said wrapper program;

send an active monitoring message to said license restriction management process to report the launch request to said license restriction management process;

receive said authorization or denial message from said license restriction management process; and, if the returned message is a denial, not invoking said application program being managed into execution, and, if the returned message is an authorization, invoking said application program being managed into execution;

and wherein said one or more computers being controlled by said operating system of said first type have one or more application programs installed thereon and have an agent process in execution thereon which controls said one or more computers to have any of several behaviors selected by configuration data, said behaviors being to:

detect launches of said application programs by monitoring activities of said computer in one of three ways, the particular way monitoring is accomplished being selectable by configuration data stored in said one or more computers, said three ways being:

polling said task list kept by said operating system and determining when new tasks appear and when old tasks disappear;

invoking said second function call of said application programming interface of said operating system to request to be notified when a new window is created; or invoking said first function call of said application programming interface of said operating system to request to be notified when a new task is created; and when launch of an application program is detected, determine the identity of the application just launched;

if active mode monitoring is selected by said configuration data, send an active monitoring message to said license restriction management process identifying the launched application and requesting a license check and requesting return of an authorization or denial message regarding the launch;

cause said application program to cease execution when a denial message is received from said license restriction management process but allowing said application program to continue executing if said return message is an authorization, and if passive mode monitoring is selected by said configuration data, send a passive monitoring message identifying the application program which was launched to said license restriction management process.

14. The apparatus of claim 13 wherein at least some of said one or more computers are controlled by an operating system of a second type designed to control the computer on which said operating system is resident, hereafter referred to as the resident computer, so as to execute both native and non-native programs, where native programs are programs which are designed to run on said resident computer under control of said operating system of said second type, and non-native programs are programs which are designed to run on any other type of computer or operating system, and wherein said operating system runs non-native programs by creation of a virtual computer implemented by execution of one or more emulation programs which control said resident computer to emulate the operation of the computer or operating system environment in which said non-native program was designed to run, said one or more computers controlled by said operating system of said second type also having a native program agent service in execution thereon which controls said one or more computers to:

detect launches of native programs and said one or more emulation programs by monitoring for the occurrence of a specific event which always occurs whenever a native program or an emulation program is launched or a request to launch has been initiated, and when said specific event occurs, determine the identity of the native program which was loaded or determine that the program launched is one or more of said emulation programs and cooperate with said operating system to insert an application programmatic interface into said virtual computer implemented by said one or more emulation programs, and request confirmation or denial of the launch from said license restriction management process, and block launching of said native program or cause said native program to cease execution when a denial message is received from said license restriction management process, and and wherein each of said one or more virtual computers created and being controlled by said operating system of said second type has inserted therein by said native program agent service during the initial establishment of said virtual computer a non-native program agent process in execution thereon which controls one or more computers to implement said application programmatic interface so as to provide at least first and second function calls such that said non-native program agent process:

automatically goes into execution when a virtual computer is created by said operating system of said second type, and responds to said first function call by determining the identity of each said non-native program in execution by said emulation programs that implements said virtual computer and sends the identity so determined to said native program agent process for transmission to said license restriction management process in a launch authorization request message, and responds to invocation of said second function call by said native program agent process if a message is received thereby from said license restriction management process denying by forcing continued execution of a non-native program identified in an argument supplied when said second function call is invoked to cease:

and wherein said native program agent process controls said one or more computers to not invoke said second function call if a message is received back from said license restriction management process authorizing execution of a non-native program.

15. A process comprising:

controlling one or more computers to carry out a license restriction management process which receives an active or passive monitoring message regarding a launch request or actual launch of a licensed application program, said launch or requested launch being either from a file system controlled by a file server or from local memory of a computer, said license restriction management process, if the message is a active monitoring message, controlling one or more file server computers to determine if said launch request or actual launch is authorized in accordance with a predetermined license restriction policy and sending back an authorization or denial message to a process which sent said active monitoring message, or if the message is a passive monitoring message, controlling one or more computers to record data regarding said launch or requested launch;

controlling one or more computers which are also being controlled by operating systems of a type which launch application programs in a way which can be detected by wrapper programs, said one or more computers also having one or more application programs installed thereon and also being programmed with one or more wrapper programs which control said one or more computers to control the launching of said application programs by controlling said one or more computers to:

move the application program being managed by said wrapper program to a hidden directory and insert said wrapper program into the directory in which said application program being managed was formerly stored;

intercept launch requests for the application program being managed by said wrapper program;

send an active monitoring message to said license restriction management process to report the launch request to said license restriction management process;

receive said authorization or denial message from said license restriction management process; and, if the returned message is a denial, not invoking said application program being managed into execution, and, if the returned message is an authorization, invoking said application program being managed into execution; and controlling one or more computers which are also being controlled by a an operating system of a second type designed to control the computer on which said operating system is resident, hereafter referred to as the resident computer, so as to launch programs in a number of different ways including at least one way which cannot be detected by a wrapper program, and which runs each application program in its own window, and which controls said resident computer to keep a task list of all the programs that are running, and which controls said computer to provide an application programmatic interface which provides at least a first function call which can be invoked to request notification each time a new program is launched and a new task is created on said task list and a second function call which can be invoked to request notification each time a new window is created, said one or more computers controlled by an operating system of said second type also having one or more application programs installed thereon, and also being programmed with an agent process which controls said resident computer so as to carry out an agent process which controls said one or more computers to:

detect launches of said application programs by monitoring activities of said computer in one of three ways, the particular way monitoring is accomplished being selectable by configuration data stored in said one or more computers, said three ways being:

polling a task list kept by said operating system of said second type and determining when new tasks appear and when old tasks disappear;

invoking said second function call of said operating system to request to be notified when a new window is created; or invoking said first function call of said operating system to request to be notified when a new task is created;

when launch of an application program is detected, determining the identity of the application program just launched;

if active mode monitoring is selected by said configuration data, sending an active monitoring message to said license restriction management process identifying the launched application program and requesting authorization or denial of continued execution of said application program;

causing said application program to cease execution when a denial message is received from said license restriction management process but allowing said launched application program to continue executing if said return message is an authorization, and if passive mode monitoring is selected by said configuration data, sending a passive monitoring message identifying the application program which was launched to said license restriction management process.

16. The process of claim 15 further comprising the additional steps of controlling one or more computers also being controlled by an operating system of a third type designed to control the computer on which said operating system is resident, hereafter referred to as the resident computer, so as to execute both native and non-native programs, where native programs are programs which are designed to run on said resident computer under control of said operating system of said third type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was designed to run, said additional steps controlling said one or more computers so as to carry but a native program agent service by detecting at least one task launching activity which is carried out on said resident computer each time a native program or said one or more emulation programs are launched and when said task launching activity is detected, determining if the launched program was a native program or an emulation program, and if the launched program was a native program, determining the identity of the native program, and sending a message to said license restriction management process informing it of the launched native program, and receiving an authorization or denial message from said license restriction management process for each launched native program, and allowing continued execution of said native program if said received message is an authorization and stopping execution of said native program if said received message is a denial, and if said native program agent service determines that launch of one or more of said emulation programs caused said task launching activity, controlling said one or more computers to implement said virtual computer with an application programmatic interface providing at least first and second function calls the functions of which are carried out by one or more programs including a non-native program agent; and controlling one or more computers also being controlled by said operating system of said third type to carry out said non-native program agent process each time a virtual computer is created so as to respond to invocation of said first function call by controlling said one or more computers to retrieve at least the identity of each 16-bit application process being executed by said virtual computer and sending a message including said at least the identity of said non-native program to said license restriction management process via said native program agent service, and wherein said native program agent service controls said one or more computers to receive authorization or denial messages from said license restriction management process and invokes said second function call if a denial message is received, and wherein said non-native program agent process responds to said invocation of said second function call by controlling said one or more computers to stop execution of said non-native program being executed by said virtual computer and named in the argument supplied when said second function call was invoked.

17. The process of claim 15 further comprising the steps of controlling one or more computers also being controlled by an operating system of a third type designed to control the computer on which said operating system is resident, hereafter referred to as the resident computer, so as to execute both native and non-native programs, where native programs are programs which are designed to run on said resident computer under control of said operating system of said third type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was designed to run using an agent program so as to carry out a a native program agent service by detecting at least one task launching activity which is carried out every time a new native program is launched such as loading of a predetermined and when said predetermined task launching activity is detected, determining the identity of the launched program, and, if said launched program is a native program which is not an emulation program to implement a virtual computer, sending a message to said license restriction management process informing it of the launching of said native program, and controlling said one or more computers to receive an authorization or denial message from said license restriction management process for each launched native program, and allowing continued execution of said native program if said received message is an authorization and stopping execution of said native program if said received message is a denial, and if the launched program which caused said predetermined task launching activity that was detected is an emulation program, controlling said one or more computers to implement an application programming interface in said virtual computer established by said virtual computer such that at least first and second function calls may be made; and controlling one or more computers also being controlled by said operating system of said third type so as to carry out a non-native agent process which carries out said functions of said first and second function calls and is initiated each time a virtual computer is established by said operating system of said third type, said non-native program agent process controlling said one or more computers to respond to invocation of said first function call by retrieving at least the identity of each non-native program being executed by said virtual computer and sending a message including said at least the identity of said non-native program to said license restriction management process via the process that invoked said first function call, and controlling said one or more computers with the process that invoked said first function call to receive authorization or denial messages from said license restriction management process and, if a denial message is received to invoke said second function call, said non-native agent process for controlling said resident computer so as to respond to invocation of said second function call by stopping execution of a non-native program named in an argument supplied when said second function call was invoked.

18. The process of claim 15 wherein said agent processes and agent services send messages to said license restriction management process by either a TCP or UDP communication protocol, depending upon the state of configuration data configuring the desired behavior of the one or more computers being controlled by said agents.

19. A process carried out by a first computer controlled by, among other programs, an agent process in a distributed system of computers and a second computer controlled by, among other programs, a license restriction management process which is coupled to said first computer by any network or other computer-to-computer communication path, comprising:

detecting launch of an application program on said first computer;

determining the identification of the application whose launch was just detected;

on said first computer, checking the application identification against a list of authorized applications kept in memory or on the hard drive of said first computer;

if the identification of the application process just launched is not on the list, terminating said application process execution;

if the identification of the application process just launched is on the list, sending an active monitoring message via said network or other computer-to-computer communication path from said first computer to said second computer identifying the application process just launched and requesting a license check;

on said second computer, using the identity of the application process gleaned from said message to determine if the launch is within a predetermined license policy, and, if so, sending an authorization message to said first computer, and if said launch is not within said predetermined license policy, sending a denial message to said first computer;

on said first computer, receiving said authorization or denial message, and if said message is an authorization, doing nothing and letting the application process continue to execute, and if said message is a denial, terminating the execution of said application process.

20. A process carried out by a first computer controlled by an agent process and an operating system of a first type designed to control the computer on which said operating system is resident, hereafter referred to as the resident computer, so as to execute both native and non-native programs, where native programs are programs which are designed to run on said resident computer under control of said operating system of said first type, and non-native programs are programs which are designed to run on some other computer or in some other operating system environment, and wherein said operating system runs non-native programs by creation of a virtual computer implemented by execution of one or more native emulation programs which control said resident computer to emulate the operation of the computer or operating system environment in which said non-native program was designed to run, and wherein each virtual computer includes an application programmatic interface providing a first function call which can be invoked to determined the identity of non-native programs being executed by said one or more emulation programs and a second function call which can be invoked to cause cessation of execution of a non-native program identified in an argument supplied to said second function call, said computer existing in a system of one or more computers which includes a computer controlled by, among other programs, a license restriction management process, comprising:

detecting launch on said first computer of either a native or non-native application program on said first computer by detecting an event which always occurs whenever a native application program or a native emulation program is launched;

determining the identification of the program whose launch was just detected either directly if it was a native program, or by invoking said first function call if the native program launched was said one or more emulation programs;

sending a message to said license restriction management process identifying the application process just launched, said message indicating it is an auto-denial license check request;

on said computer controlled by said license restriction management process, checking the application identification against a list of authorized applications kept in memory or on the hard drive of said computer controlled by said license restriction management process;

if the identification of the application process just launched is not on the list, sending a message to said agent process requesting termination of the execution of said application process;

on said computer controlled by said agent process, receiving said termination request message and terminating execution of said application process directly or by invoking a function call provided by said operating system of said first type or by invoking said second function call if the program launched was a non-native program;

if the identification of the application process just launched is on the list kept at said computer controlled by said license restriction management process, using the identity of the application process just launched gleaned from said message from said agent process to determining if said launch is within a predetermined license policy, and, if so, sending an authorization message to said agent process, and if said launch is not within said license policy, sending a denial message to said computer controlled by said agent process;

on said computer controlled by said agent process, receiving said authorization or denial message, and if said message is an authorization, doing nothing and letting the application process continue to execute, and if said message is a denial, terminating the execution of said application process directly or by invoking a function call provided by said operating system of said first type or by invoking said second function call if the program launched was a non-native program.

21. An apparatus comprising:

a network;

a file server coupled to said network and having a license restriction management process in execution thereon;

a computer coupled to said file server by said network and controlled by any one of a plurality of diverse operating systems each of which launches programs in a way that can be detected by a wrapper program, each said computer also having one or more application programs installed thereon, each application program managed by a wrapper process which controls said computer to perform the following functions:

move the application program being managed by said wrapper program to a hidden directory and insert said wrapper program into the directory in which said application program being managed was formerly stored;

intercept launch requests for the application program being managed by said wrapper program;

send an active or passive monitoring message to said license restriction management process to report the launch request to said license restriction management process, said message being active or passive depending upon configuration data;

if said message was an active monitoring message, receive an authorization or denial message from said license restriction management process; and, if the returned message is a denial, not invoking said application program being managed into execution, and, if the returned message is an authorization, invoking said application program being managed into execution;

if said message sent to said license restriction management process was a passive monitoring message, automatically invoking into execution the application program being managed by the wrapper program when said launch request is intercepted and sending a message to said license restriction management process reporting the identification of the application program just launched;

one or more programs controlling said file server to implement said license restriction management process to control said file server so as to receive passive monitoring messages from said wrapper programs and react thereto by simply recording data regarding the launch, or receive active monitoring messages and performing license checks for the application program identified by said active monitoring message, and if execution of said application program would not exceed violate a license policy encoded in data stored in memory or a license policy file, send an authorization message to said wrapper process, and if the execution of said application program would violate said license policy, send a denial message to said wrapper process.

22. An apparatus comprising:

a network;

a file server coupled to said network and having a license restriction management process in execution thereon;

one or more computers coupled to said file server by said network and being controlled by an operating system of a first type designed to control the computer on which said operating system is resident, hereafter referred to as the resident computer, so as to launch programs in a number of different ways including at least one way which cannot be detected by a wrapper program, and which runs each application program in its own window, and which controls said resident computer to keep a task list of all the programs that are running, and which controls said computer to provide an application programmatic interface which provides at least a first function call which can be invoked to request notification each time a new program is launched and a new task is created on said task list and a second function call which can be invoked to request notification each time a new window is created, and having one or more application programs installed thereon and having an agent process in execution thereon which controls said one or more computers to have the following behaviors:

detect launches of said application programs by monitoring activities of said computer in one of three ways, the particular way monitoring is accomplished being selectable by configuration data stored in said one or more computers, said three ways being:

polling a task list kept by said operating system and determining when new tasks appear and when old tasks disappear;

invoking said second function call of said operating system to request to be notified when a new window is created; or invoking said first function call of said operating system to request to be notified when a new task is created;

when launch of an application program is detected, determine the identity of the application program just launched;

if active mode monitoring is selected by said configuration data, send an active monitoring message to said license restriction management process identifying the launched application and requesting a license check and requesting return of an authorization or denial message regarding the launch;

cause said application program to cease execution when a denial message is received from said license restriction management process but allowing said application program to continue executing if said return message is an authorization, and if passive mode monitoring is selected by said configuration data, send a passive monitoring message identifying the application program which was launched to said license restriction management process; and one or more programs controlling said file server to implement said license restriction management process so as to receive passive monitoring messages from said agent process and react thereto by simply recording data regarding the launch, or receive active monitoring messages and react thereto by performing license checks for the application program identified by said active monitoring message, and if execution of said application program would not a license policy, send an authorization message to said agent process, and if the execution of said application program would violate a license policy, send a denial message to said agent process.

23. An apparatus comprising:

a network;

a file server coupled to said network and having a license restriction management process in execution thereon;

one or more computers coupled to said file server by said network and being controlled by an operating system of a first type designed to control the computer on which said operating system is resident, hereafter referred to as the resident computer, so as to execute both native and non-native programs, where native programs are programs which are designed to run on said resident computer under control of said operating system of said first type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was designed to run, said one or more computers also having one or more native and non-native application programs installed thereon and having a native program agent service in execution thereon, said native program agent service controlling said one or more computers to have the following behaviors:

detect launches of native application programs by monitoring activities of said computer to determine when a particular task launching event occurs which always occurs when a native application program is launched and which can be reliably detected by said native program agent service;

when launch of a native application program is detected, determine the identity of the application program just launched;

if active mode monitoring is selected by said configuration data, send an active monitoring message to said license restriction management process identifying the launched native application program and requesting a license check and requesting return of an authorization or denial message regarding the launch;

cause said native application program to cease execution when a denial message is received from said license restriction management process but allowing said native application program to continue executing if said return message is an authorization, and if passive mode monitoring is selected by said configuration data, send a passive monitoring message identifying the native application program which was launched to said license restriction management process; and one or more programs controlling said file server to implement said license restriction process so as to receive passive monitoring messages from said agent process and react thereto by simply recording data regarding the launch, or receive active monitoring messages and react thereto by performing license checks for the application program identified by said active monitoring message, and if execution of said application program would not violate a license policy, send an authorization message to said agent process, and if the execution of said application program would violate a license policy, send a denial message to said agent process.

24. An apparatus comprising:

a network;

a file server coupled to said network and having a license restriction management process in execution thereon;

one or more computers coupled to said file server by said network and being controlled by an operating system of a first type designed to control the computer on which said operating system is resident, hereafter referred to as the resident computer, so as to execute both native and non-native programs, where native programs are programs which are designed to run on said resident computer under control of said operating system of said first type, and non-native programs are programs which are designed to run on some other computer or in some other operating system environment, and wherein said operating system runs non-native programs by creation of a virtual computer implemented by execution of one or more emulation programs which control said resident computer to emulate the operation of the computer or operating system environment in which said non-native program was designed to run, said one or more computers also having one or more native and non-native application programs installed thereon, and wherein said one or more emulation programs that implement virtual computers are native programs, and having a native program agent service in execution thereon and a a non-native program agent process in execution in every virtual computer, said native program agent service controlling said one or more computers to have the following behaviors:

detect launches of native programs by monitoring activities of said computer to determine when a particular event occurs which always occurs whenever a native program is launched;

when launch of a native program is detected, determine if the native program so launched is a native application program or a native emulation program, and, if the native program launched is a native application program, determine the identity of the application just launched, and if the native program must launched is an emulation program, controlling said resident computer to implement an application programming interface in said virtual computer having at least a first function call that can be invoked to cause said non-native agent process to determine the identity of the one or more non-native application programs being executed by said virtual computer, and a second function call which can be invoked to cause said non-native agent process to terminate the execution of any non-native application program named in the argument supplied when invoking said second function call, and for controlling said computer to invoke said first function call and receive back the identity of all non-native application programs being executed by said virtual computer;

if active mode monitoring is selected by said configuration data and a native application program was launched, send an active monitoring message to said license restriction management process identifying the launched application and requesting a license check and requesting return of an authorization or denial message regarding the launch, and if a virtual computer was created and a message is received after invoking said first function call identifying the non-native program(s) being executed by said virtual computer, sending a message to said license restriction management process identifying the non-native programs being executed by said virtual computer and requesting authorization or denial for the launch;

cause said native application program to cease execution when a native application program has been launched and a denial message is received from said license restriction management process but allowing said native application program to continue executing if an authorization message is received, and, if a virtual computer has been established and a message is received from said license restriction management process denying authorization for the launch of one or more non-native programs being executed by said virtual computer, invoking said second function call at least once and supplying the identities of all non-native programs the execution of which is not authorized, and if passive mode monitoring is selected by said configuration data, send a passive monitoring message identifying the application program which was launched to said license restriction management process; and and controlling said one or more computers being controlled by an operating system of said first type such that whenever said operating system of said first type creates one or more virtual computers, said non-native program agent process goes into execution thereon and controls said one or more resident computers to:

respond to invocation of said first function call by determining and transmitting to said native program agent service the identity of each said non-native application program in execution within said virtual computer for transmission to said license restriction management process by said native program agent service, and receive a message from said license restriction management process via said native program agent process for each non-native application program in execution within said virtual computer which has been denied continued execution by virtue of invocation of said second function call and responding thereto by causing all non-native application programs identified in the argument to said second function call to cease execution; and one or more programs for controlling said file server to implement said license restriction management process so as to receive passive monitoring messages from said native program agent service and react thereto by simply recording data regarding the launch, or receive active monitoring messages from said native program agent service(s) executing on said one or more computers coupled to said file server and perform a license check for each native or non-native application program identified by an active monitoring message, and if execution of said application program identified in said message would not violate a license policy, send an authorization message to said native program agent service which sent said active monitoring message, and if the execution of said application program would violate a license policy, send a denial message to said native program agent service which sent said active monitoring message.

* * * * *